(12) United States Patent
Fedeyko

(10) Patent No.: US 10,500,574 B2
(45) Date of Patent: Dec. 10, 2019

(54) LTA CATALYSTS HAVING EXTRA-FRAMEWORK IRON AND/OR MANGANESE FOR TREATING EXHAUST GAS

(71) Applicant: Johnson Matthey Public Limited Company, London (GB)

(72) Inventor: Joseph Fedeyko, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 53 days.

(21) Appl. No.: 15/797,169

(22) Filed: Oct. 30, 2017

(65) Prior Publication Data
US 2018/0117573 A1 May 3, 2018

Related U.S. Application Data

(60) Provisional application No. 62/414,883, filed on Oct. 31, 2016.

(51) Int. Cl.
| | | |
|---|---|---|
| B01J 29/06 | (2006.01) | |
| B01J 29/78 | (2006.01) | |
| F01N 3/20 | (2006.01) | |
| B01D 53/94 | (2006.01) | |
| B01J 35/00 | (2006.01) | |
| B01J 35/04 | (2006.01) | |
| B01J 37/02 | (2006.01) | |
| B01J 37/08 | (2006.01) | |
| F01N 3/08 | (2006.01) | |
| B01J 29/76 | (2006.01) | |
| B01J 23/00 | (2006.01) | |
| B01J 23/34 | (2006.01) | |
| B01J 23/63 | (2006.01) | |
| B01J 23/83 | (2006.01) | |
| B01J 29/80 | (2006.01) | |
| B01J 35/10 | (2006.01) | |
| B01J 37/00 | (2006.01) | |

(52) U.S. Cl.
CPC ........ *B01J 29/783* (2013.01); *B01D 53/9418* (2013.01); *B01J 29/7607* (2013.01); *B01J 29/78* (2013.01); *B01J 29/7807* (2013.01); *B01J 29/7815* (2013.01); *B01J 35/0006* (2013.01); *B01J 35/04* (2013.01); *B01J 37/0203* (2013.01); *B01J 37/0236* (2013.01); *B01J 37/0246* (2013.01); *B01J 37/086* (2013.01); *F01N 3/0814* (2013.01); *F01N 3/0842* (2013.01); *F01N 3/2066* (2013.01); *F01N 3/2073* (2013.01); *B01D 2255/2073* (2013.01); *B01D 2255/20738* (2013.01); *B01D 2255/20761* (2013.01); *B01D 2255/50* (2013.01); *B01D 2255/91* (2013.01); *B01D 2255/911* (2013.01); *B01D 2255/915* (2013.01); *B01D 2255/9155* (2013.01); *B01J 23/002* (2013.01); *B01J 23/34* (2013.01); *B01J 23/63* (2013.01); *B01J 23/83* (2013.01); *B01J 29/80* (2013.01); *B01J 35/1061* (2013.01); *B01J 37/0009* (2013.01); *B01J 37/0244* (2013.01); *B01J 2229/186* (2013.01); *B01J 2229/36* (2013.01); *B01J 2229/38* (2013.01); *F01N 2370/04* (2013.01); *F01N 2610/02* (2013.01); *F01N 2610/1453* (2013.01)

(58) Field of Classification Search
CPC .......... B01D 53/9418; B01D 2255/911; B01D 2255/91; B01D 2255/50; B01D 2255/915; B01D 2255/9155; B01D 2255/2073; F01N 3/2066; F01N 3/0842; F01N 3/0814; F01N 2370/04; F01N 3/2073; B01J 37/086; B01J 37/0236; B01J 37/0201; B01J 37/0203; B01J 37/0215; B01J 37/0246; B01J 37/0244; B01J 37/0009; B01J 37/30; B01J 35/04; B01J 35/0006; B01J 29/7607; B01J 29/7807; B01J 2229/186; B01J 2229/36; B01J 2229/38; C01B 39/14
USPC ....... 502/60, 74, 64, 66, 69, 527.19, 527.24; 423/700, 235, 239.1, 239.2; 422/177
See application file for complete search history.

(56) References Cited

U.S. PATENT DOCUMENTS

| | | | | |
|---|---|---|---|---|
| 7,902,107 | B2 * | 3/2011 | Patchett | B01D 5/0054 502/74 |
| 9,162,218 | B2 * | 10/2015 | Bull | B01D 53/9418 |
| 2008/0241060 | A1 * | 10/2008 | Li | B01D 53/9418 423/700 |
| 2010/0172828 | A1 * | 7/2010 | Althoff | B01D 53/9418 423/713 |
| 2011/0085942 | A1 | 4/2011 | Ogyu et al. | |
| 2011/0229391 | A1 * | 9/2011 | Paulus | B01D 53/9468 423/213.2 |
| 2013/0251611 | A1 * | 9/2013 | Wen | B01D 53/9413 423/213.5 |
| 2014/0072490 | A1 * | 3/2014 | Dotzel | B01J 23/30 423/212 |

(Continued)

FOREIGN PATENT DOCUMENTS

| | | |
|---|---|---|
| CN | 101433855 A | 5/2009 |
| EP | 3205398 A1 | 8/2017 |

(Continued)

OTHER PUBLICATIONS

Jo et al.; Synthesis of High-Silica LTA and UFI Zeolites and NH3-SCR Performance of Their Copper-Exchanged Form; ACS Catal. 2016, 6, 2443-2447.

(Continued)

*Primary Examiner* — Elizabeth D Wood

(57) ABSTRACT

Provided are compositions, articles, systems and methods that comprise or use a catalyst composition comprising a zeolite having an LTA structure with iron, manganese or a combination thereof as an extra-framework metal. The zeolite can have a mole ratio of silica-to-alumina (SAR) of about 15 to about 70 and can contain about 0.5 to about 10 weight percent, based on the total weight of the zeolite, of extra-framework iron, manganese or a combination thereof.

18 Claims, 2 Drawing Sheets

(56) References Cited

U.S. PATENT DOCUMENTS

| | | | | |
|---|---|---|---|---|
| 2014/0322127 A1* | 10/2014 | Althoff | ............. | B01D 53/9418 |
| | | | | 423/714 |
| 2014/0328738 A1* | 11/2014 | Chandler | ............. | B01J 37/0246 |
| | | | | 423/213.2 |
| 2015/0238946 A1* | 8/2015 | Narula | ............... | B01D 53/9418 |
| | | | | 502/74 |
| 2015/0367336 A1* | 12/2015 | Trukhan | ................. | B01J 29/763 |
| | | | | 423/239.2 |
| 2015/0367337 A1* | 12/2015 | Yang | ..................... | B01J 29/763 |
| | | | | 423/239.2 |
| 2016/0303550 A1* | 10/2016 | Yang | ..................... | B01J 29/763 |

FOREIGN PATENT DOCUMENTS

| | | | |
|---|---|---|---|
| EP | 3205402 A1 | | 8/2017 |
| WO | WO 2000/72965 | * | 12/2000 |
| WO | 2008132452 A2 | | 11/2008 |
| WO | 2017070416 A1 | | 4/2017 |

OTHER PUBLICATIONS

Shi et al.; Low temperature decomposition of NOx over Fe—Mn/H-beta catalysts in the presence of oxygen; Catalysis Communications 9 (2008) 1356-1359.

Boal et al.; Facile Synthesis and Catalysis of Pure-Silica and Heteroatom LTA; Chem. Mater. 2015, 27, 7774-7779.

\* cited by examiner

LTA CATALYSTS HAVING EXTRA-FRAMEWORK IRON AND/OR MANGANESE FOR TREATING EXHAUST GAS

CROSS REFERENCE TO RELATED APPLICATIONS

This application claims priority benefit to U.S. Provisional Patent Application No. 62/414,883 filed on Oct. 31, 2016, which is incorporated herein by reference.

FIELD OF INVENTION

The present invention relates to catalysts comprising a zeolite having an LTA framework type where the zeolite has a silica-to-alumina ratio (SAR) of about 15 to about 70 and the zeolite comprises iron, manganese or a mixture of iron and manganese as an extra-framework metal, and to articles comprising these catalysts and methods of preparing these articles and methods of using these catalysts for treating exhaust gases, preferably from engines, especially diesel engines.

BACKGROUND

Combustion of hydrocarbon-based fuels in electrical power stations and engines produces flue or exhaust gas that contains, in large part, relatively benign nitrogen ($N_2$), water vapor ($H_2O$), and carbon dioxide ($CO_2$). However, the flue and exhaust gases also contain, in relatively small part, noxious and toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically, exhaust gases from lean burn gas engines and flue gases from electrical power stations have a net oxidizing effect due to the high proportion of oxygen that is provided to ensure adequate combustion of the hydrocarbon fuel. In such gases, one of the most burdensome components to remove is $NO_x$, which includes nitric oxide (NO) and nitrogen dioxide ($NO_2$). The reduction of $NO_x$ to $N_2$ is particularly problematic because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

$$4NO + 4NH_3 + O_2 \rightarrow 4N_2 + 6H_2O$$

$$2NO_2 + 4NH_3 + O_2 \rightarrow 3N_2 + 6H_2O$$

$$NO + NO_2 + 2NH_3 \rightarrow 2N_2 + 3H_2O$$

Zeolites are a type of molecular sieve having a three dimensional framework made of aluminosilicates. Zeolites having certain structures, such as AEI, AFX, BEA, CHA and MOR are known to be useful as SCR catalysts. Such zeolites have a molecularly porous crystalline or pseudo-crystalline structure constructed primarily of alumina and silica. The catalytic performance of these zeolites can be improved by incorporating an extra-framework metal, for example, by a cationic exchange wherein a portion of ionic species existing on the surface of the framework is replaced by metal cations, such $Cu^{2+}$. Typically, higher metal concentrations can correspond to higher catalytic performance.

CHA zeolites containing extra-framework iron are known to be stable. However, these catalysts have a slow transient response when Fe or Mn is present as an extra-framework metal. However, the use of LTA, a small pore zeolite, with either Fe or Mn as an extra-framework metal provides the same stability and hydrocarbon poisoning benefits as found with the use of CHA zeolites containing extra-framework metals, along with the transient response of a large pore zeolite.

SUMMARY OF THE INVENTION

Surprisingly, it has been found that zeolites having an LTA structure containing extra-framework iron, manganese or a combination thereof, and a silica-to-alumina ratio (SAR) of about 15 to about 70 can provide better light-off and reduces the chance of hydrocarbon poisoning compared to other zeolite catalysts with similar SARs and similar metal loadings.

The catalysts of the present invention can provide improved catalytic performance by providing better low temperature light off in applications such as selective catalytic reduction (SCR) of $NO_x$ and oxidation of ammonia when compared to other catalysts. The catalysts of the present invention can provide improved resistance to hydrocarbon poisoning compared to other catalysts.

Accordingly, in a first aspect of the invention, provided are catalyst compositions comprising a zeolite having an LTA structure and a mole ratio of silica-to-alumina of about 10 to about 70 and about 0.5 to about 10 weight percent of iron, manganese or a combination thereof, based on the total weight of the zeolite.

Also provided are catalytic articles comprising a catalyst composition described herein and a substrate upon and/or within which the catalyst is disposed.

Systems for treating exhaust gas comprising (a) a catalyst article described herein; and (b) one or more upstream components selected from a diesel oxidation catalyst, a NOx absorber catalyst, a lean NOx trap, a filter, an $NH_3$ injector, and an SCR catalyst; and (c) optionally a downstream ammonia slip catalyst are also provided. The catalyst described herein can be used as the first catalyst in the system or can be placed downstream of one or more catalysts. A system can further comprise one or more of a fuel injector, a second urea injector, an SCRF, an additional SCR, a diesel oxidation catalyst (DOC) or a Diesel Exotherm Catalyst (DEC). The system can also further comprise one or more sensors that can detect NOx, ammonia, particulate matter (PM), etc.

Methods for treating an exhaust gas comprising (a) contacting an exhaust gas comprising $NO_x$ and a reductant with a catalyst composition described herein; and (b) selectively reducing at least a portion of the $NO_x$ to $N_2$ and $H_2O$ and further provided.

DETAILED DESCRIPTION OF THE INVENTION

Figure 1:
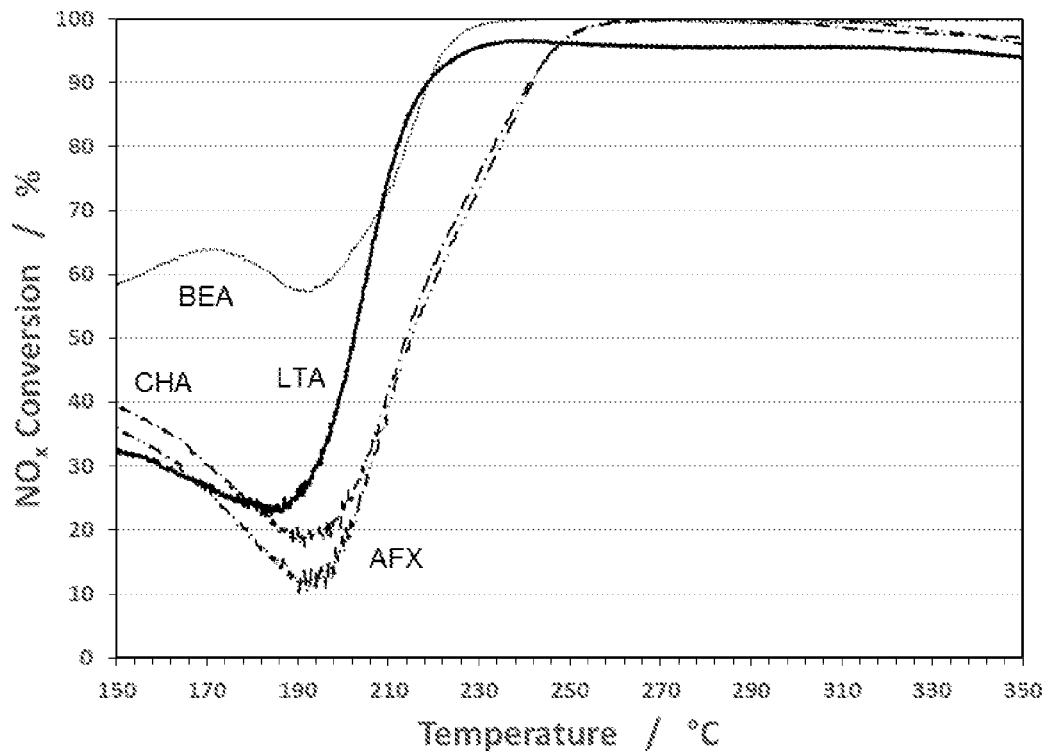
FIG. 1 shows the percent NOx conversion using fresh AFX, BEA, CHA and LTA catalysts containing extra-framework Mn at temperatures from 150° C. to 500° C.

One aspect of the invention is directed to catalyst compositions comprising a zeolite (an aluminosilicate) having an LTA structure with a silica-to-alumina mole ratio (SAR) of about 15 to about 70 and about 0.5 to about 10 weight percent of exchanged iron, manganese or a combination thereof, based on the weight of the zeolite.

As used herein, the term "LTA" refers to an LTA framework type as recognized by the International Zeolite Association (IZA) Structure Commission. The majority of the aluminosilicate zeolite structure is constructed of alumina and silica, but can include framework metals other than aluminum (i.e., metal-substituted zeolites). The term "metal exchanged" means a zeolite having extra-framework or free metal ions associated with the framework structure, but not form part of the framework itself. The metal ions exchanged into LTA are iron, manganese or a combination thereof. Any aluminosilicate isotype of LTA with a silica-to-alumina mole ratio (SAR) of about 15 to about 70 is suitable for the present invention.

The primary crystalline phase of the molecular sieve is LTA, although other crystalline phases, such as FAU, can also be present in minor amounts, generally less than 10%, preferably less than 5%, more preferably less than 2%, even more preferably, less than 1%, by weight. The primary crystalline phase can comprise at least about 90 weight percent LTA, preferably at least about 95 weight percent LTA, and even more preferably at least about 98 or at least about 99 weight percent LTA. The molecular sieve can contain minor amounts of impurities of zeolites that may be used in the synthesis of LTA, such as FAU. These minor amount are preferably less than 5 weight percent, more preferably less than about 2 weight percent, or most preferably less than about 1 weight percent. Preferably, the LTA molecular sieve is substantially free of other crystalline phases and is not an intergrowth of two or more framework types. By "substantially free" with respect to other crystalline phases, it is meant that the molecular sieve contains at least 99 weight percent LTA.

The zeolites can have a silica-to-alumina ratio mole (SAR) of about 15 to about 70, about 15 to about 60, about 15 to about 55, about 15 to about 50, about 15 to about 45, about 15 to about 40, about 15 to about 35, about 15 to about 30, about 20 to about 70, about 20 to about 60, about 20 to about 55, about 20 to about 50, about 20 to about 45, about 20 to about 40, about 20 to about 35 or about 20 to about 30. The silica-to-alumina ratio of zeolites can be determined by conventional analysis. This ratio is meant to represent, as closely as possible, the ratio in the rigid atomic framework of the zeolite crystal and to exclude silicon or aluminum in the binder or in cationic or other form within the channels. Since it can be difficult to directly measure the silica to alumina ratio of zeolite after it has been combined with a binder, particularly an alumina binder, these silica-to-alumina ratios are expressed in terms of the SAR of the zeolite per se, i.e., prior to the combination of the zeolite with the other catalyst components.

The LTA zeolite also comprises iron, manganese or a mixture of iron and manganese as an extra-framework metal. As used herein, an "extra-framework metal" is a metal that resides within the framework of the zeolite molecular sieve but is not a part of the framework of the zeolite. Preferably, the presence of the extra-framework metal(s) facilitates the treatment of exhaust gases, such as exhaust gas from a diesel engine, including processes such as $NO_x$ reduction, $NH_3$ oxidation, and $NO_x$ storage. The term a "iron, manganese or a mixture thereof" means that the zeolite can comprise: (a) iron, (b) manganese, (c) a mixture of exchanged iron and manganese; or (d) a mixture of a zeolite comprising exchanged iron with a zeolite comprising exchanged manganese, where the zeolites have an LTA Framework Type and a silica-to-alumina ratio (SAR) of about 15 to about 70.

Iron, manganese or a combination thereof can be present in the zeolite at a concentration of about 0.5 to about 10 weight percent (wt %) based on the total weight of the zeolite, for example from about 0.5 wt % to about 7.5 wt %, from about 1 to about 5 wt %, about 2.5 wt % to about 4.0 wt %, and about 3 wt % to about 3.5 wt %.

The extra-framework metal can be present in an amount from about 40 to about 120 $g/ft^3$ of zeolite or washcoat loading, including for example about 50 to about 100 $g/ft^3$, or about 75 to about 90 $g/ft^3$.

The extra-framework metal can be present in an amount relative to the amount of aluminum in the zeolite, namely the framework aluminum. As used herein, the extra-framework metal:aluminum (M:Al) ratio is based on the relative molar amount of extra-framework metal to molar framework Al in the zeolite. The catalyst zeolite can have a M:Al ratio of about 0.1 to about 1.0, preferably about 0.2 to about 0.5. An M:Al ratio of about 0.2 to about 0.5 is particularly useful where M is iron, manganese or a combination of iron and manganese, and more particularly where M is iron, manganese or a combination of iron and manganese and the SAR of the zeolite is about 15 to about 70.

A zeolite containing an extra-framework metal can be created by blending the zeolite into a solution containing soluble slats or precursors of the catalytically active metal(s). The pH of the solution can be adjusted to induce precipitation of the catalytically active metal cations onto or within the zeolite structure (but not including the zeolite framework). For example, an LTA zeolite can be immersed in a solution containing iron acetate, iron nitrate, or iron sulfate; or manganese acetate or manganese nitrate, for a time sufficient to allow incorporation of the catalytically active iron or manganese cations into the molecular sieve structure by ion exchange. Un-exchanged iron or manganese ions can be precipitated out. Depending on the application, a portion of the un-exchanged ions can remain in the zeolite as free iron or manganese. The metal-exchanged zeolite can then be washed, dried, and calcined.

Generally, ion exchange of the iron or manganese cations into or on the molecular sieve can be carried out at room temperature or at a temperature up to about 80° C. over a period of about 1 to 24 hours at a pH of about 7. The resulting catalytic molecular sieve can be dried, preferably at about 100 to 120° C. overnight, and then calcined at a temperature of at least about 500° C.

A catalyst composition can comprise a combination of at least one of iron and manganese as an extra-framework metal and at least one alkali or alkaline earth metal. The alkali or alkaline earth metal can be selected from barium, calcium, cesium, magnesium, potassium, rubidium, sodium, strontium, or a combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. Preferred alkali or alkaline earth metals include calcium, potassium, and combinations thereof. The catalyst composition can be essentially free of barium and/or magnesium. The catalyst can be essentially free of any alkali or alkaline earth metal except calcium and potassium. The catalyst can be essentially free of any alkali or alkaline earth metal except calcium. The catalyst can be essentially free of any alkali or alkaline earth metal except potassium. As used herein, the term "essentially free" means that the catalyst does not have an appreciable amount of the particular metal. That is, the particular metal is not present in amount that would affect the basic physical and/or chemical properties of the catalyst, particularly with respect to the catalyst's capacity to selectively reduce or store $NO_x$.

The zeolite can have an alkali content of less than 3 weight percent, more preferably less than 1 weight percent, and even more preferably less than 0.1 weight percent.

One or more alkali and alkaline earth metal (collectively $A_M$) can be present in the zeolite in an amount relative to the amount of extra-framework metal (M) in the zeolite. Preferably, M and $A_M$ are present, respectively, in a molar ratio of about 15:1 to about 1:1, for example about 10:1 to about 2:1, about 10:1 to about 3:1, or about 6:1 to about 4:1, particularly were M is iron and $A_M$ is calcium. When an alkali and/or alkaline earth metal, such as calcium, is present, the amount of iron, manganese or a combination thereof, can be present at less than 10 weight percent, for example less than 8 weight percent, less than 6 weight percent, less than 5 weight percent, less than 4 weight percent, less than 3 weight percent, or less than 2 weight percent, based on the weight of the zeolite.

The relative cumulative amount of extra-framework iron, manganese or a combination thereof (M) and alkali metal, alkaline earth metal or a combination thereof ($A_M$) can be present in the zeolite in an amount relative to the amount of aluminum in the zeolite, namely the framework aluminum. As used herein, the (M+$A_M$):Al ratio is based on the relative molar amounts of M+$A_M$ to molar framework Al in the corresponding zeolite.

The iron, manganese and alkali/alkaline earth metal can be added to the zeolite via any known technique such as ion exchange, impregnation, isomorphous substitution, etc. The extra-framework metal and the alkali or alkaline earth metal can be added to the zeolite in any order (e.g., the iron and/or manganese can be exchanged before, after, or concurrently with the alkali or alkaline earth metal), but preferably the alkali or alkaline earth metal is added prior to or concurrently with the iron or manganese, particularly when the alkali earth metal is calcium.

The zeolite catalysts of the present invention also contain a relatively large amount of cerium (Ce). Cerium can be present in the catalyst at a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite.

Cerium can be present in the catalyst at loadings of about 50 to about 550 g/ft$^3$. Other ranges of Ce include: above 100 g/ft$^3$, above 200 g/ft$^3$, above 300 g/ft$^3$, above 400 g/ft$^3$, above 500 g/ft$^3$, from about 75 to about 350 g/ft$^3$, from about 100 to about 300 g/ft$^3$, and from about 100 to about 250 g/ft$^3$.

The concentration of Ce can exceed the theoretical maximum amount available for exchange on the iron, manganese or a combination of iron and manganese promoted zeolite.

Ce can be present in more than one form, such as Ce ions, monomeric ceria, oligomeric ceria, and combinations thereof, provided that said oligomeric ceria has a mean crystal size of less than 5 µm, for example less than 1 µm, about 10 nm to about 1 µm, about 100 nm to about 1 µm, about 500 nm to about 1 µm, about 10 to about 500 nm, about 100 to about 500 nm, and about 10 to about 100 nm. As used herein, the term "monomeric ceria" means $CeO_2$ as individual molecules or moieties residing freely on and/or in the zeolite crystal and/or weakly bonded to the zeolite, but not the framework of the zeolite. As used herein, the term "oligomeric ceria" means nanocrystalline $CeO_2$ residing freely on and/or in the zeolite crystal and/or weakly bonded to the zeolite, but not the framework of the zeolite.

Catalysts of the present invention are applicable for heterogeneous catalytic reaction systems (i.e., solid catalyst in contact with a gas reactant). To improve at least one of contact surface area, mechanical stability, and fluid flow characteristics, the catalysts can be disposed on and/or within a substrate, preferably a porous substrate.

A second aspect of the invention is directed to catalyst articles for improving environmental air quality, particularly for improving exhaust gas or flue emissions generated by lean burn internal combustion engines, power plants, gas turbines, and the like. Exhaust gas emissions can be improved, at least in part, by reducing at least one of $HN_3$ and $NO_x$ concentrations in lean burn exhaust gas over a broad operational temperature range. Useful catalysts are those that selectively reduce $NO_x$ and/or oxidize ammonia in an oxidative environment (i.e., an SCR catalyst and/or AMOX catalyst).

A washcoat containing the catalyst can be applied to an inert substrate, such as a honeycomb cordierite brick or a corrugated metal plate.

The catalyst can be kneaded along with other components such as fillers, binders, and reinforcing agents, into an extrudable paste which is then extruded through a die to form a honeycomb brick.

A catalyst article can comprise a metal-promoted LTA zeolite catalyst described herein coated on and/or incorporated into a substrate.

Certain aspects of the invention provide a catalytic washcoat. The washcoat comprising the LTA catalyst described herein is preferably a solution, suspension, or slurry. Suitable coatings include surface coatings, coatings that penetrate a portion of the substrate, coatings that permeate the substrate, or some combination thereof.

In certain aspect, the invention is a catalyst composition comprising LTA aluminosilicate molecular sieve crystals having a mean crystal size (i.e., of individual crystals including twinned crystals) of greater than about 0.5 µm, preferably between about 0.1 and about 15 µm, such as about 0.5 to about 5 µm, about 0.7 to about 1.5 µm, about 1 to about 5 µm, or about 1 µm to about 10 µm, particularly for catalysts which are free or substantially free of halogens, such as fluorine. Crystal size is the length of one edge of a face of the crystal, preferably the longest edge provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g. 50-200) are examined and the longest dimensions of the individual crystals parallel to the horizontal line of the straight edge are measured and recorded. (Particles that are clearly large polycrystalline aggregates should not be included the measurements.) Based on these measurements, the arithmetic mean of the sample crystal sizes is calculated.

In addition to the mean crystal size, D50, catalyst compositions preferably have a majority of the crystal sizes are greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. Preferably, the first and third quartile of the sample of crystals sizes is greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm.

The catalyst compositions can have a D90 (90% of the crystals having a size that is less than or equal to the D90 values) preferably less than about 10 µm, preferably between about 5 and about 10 µm, such as about 5 to about 9 µm, about 5 to about 8 µm, about 5 to about 7 µm.

The catalyst can be an iron, manganese or a combination thereof, promoted LTA zeolite having one or more of:

(a) a silica-to-alumina ratio mole (SAR) of about 15 to about 70, about 15 to about 60, about 15 to about 55, about 15 to about 50, about 15 to about 45, about 15 to about 40, about 15 to about 35, about 15 to about 30, about 20 to about 70, about 20 to about 60, about 20 to about 55, about 20 to about 50, about 20 to about 45, about 20 to about 40, about 20 to about 35 or about 20 to about 30;

(b) a mean crystal size of greater than about 0.5 µm, preferably between about 0.1 and about 15 µm, such as about 0.5 to about 5 µm, about 0.7 to about 1.5 µm, about 1 to about 5 µm, or about 1 µm to about 10 µm;

(c) a majority of the crystals can have a crystal size of greater than about 0.5 µm, preferably between about 0.1 and about 15 µm, such as about 0.5 to about 5 µm, about 0.7 to about 1.5 µm, about 1 to about 5 µm, or about 1 µm to about 10 µm; and (d) a D90 (90% of the crystals having a size that is less than or equal to the D90 values) preferably less than about 10 µm, preferably between about 5 and about 10 µm, such as about 5 to about 9 µm, about 5 to about 8 µm, about 5 to about 7 µm.

Preferably these catalysts are free or substantially free of halogens, such as fluorine.

Such catalysts can have high hydrothermal durability and also yield high $NO_x$ conversions when used as SCR catalysts.

An SCR catalyst can comprise two or more catalysts arranged in separate zones or formulated as blends. For example, the SCR catalyst can comprise a first zone comprising an LTA zeolite as defined herein, and a second zone containing a second catalyst such as a different SCR catalyst. The first and second zones can be on a single substrate, such as wall-flow filter or a flow-through honeycomb, or on separate substrates, but are preferably disposed on or within a single unit of substrate. Examples of a second catalyst include molecular sieves, such as aluminosilicates, silicoaluminophosphates, and ferrosilicates including small pore molecular sieves, medium pore molecular sieves, and large pore molecular sieves. For certain applications, small pore zeolites and SAPOs are preferred. An example of a small pore molecular sieve is CHA. Another example of a small pore molecular sieve is AFX. Other small pore molecular sieves include AFX, AFT, DDR, EM, KFI, LEV and RHO. Other useful molecular sieves include BEA, MFI, MOR, and FER. The molecular sieve of the second catalyst can be in the $H^+$ form, and/or can be exchanged with a transition metal, such as Cu, Fe, Ni, Co, and Mn, a noble metal such as Au, Ag, Pt, Pd, and Ru, or some combination thereof. Particularly useful metals include Fe and Cu. Other examples of a second catalyst include vanadium catalysts, such as $V_2O_5$ supported on silica, titania, or alumina, and optionally in combination with other metals such as tungsten and/or molybdenum. The first zone can be upstream or downstream of the second zone with respect to flow of exhaust gas, but is preferably downstream. The upstream zone and downstream zone can correspond to the front end and rear end, respectively, of a flow-through honeycomb substrate, or can correspond to the inlet and outlet sides, respectively, of a wall-flow filter. The two zones can partially or fully overlap each other. For partial overlap, the overlapping section will create a third, intermediate zone. Alternatively, the two zones can be adjacent to one another, with little or no gap between them (i.e., less than 0.2 inches). Alternatively, the first and second catalysts can be blended together and washcoated as a single catalyst layer or extruded as a homogeneous honeycomb substrate. In certain aspects, the catalyst can further comprise a third catalyst material which is blended with one or both of the first and second catalytic materials or is disposed in a third zone, wherein the third zone is downstream or upstream of the first and/or second catalyst, but is preferably on the same substrate.

A washcoat can also include non-catalytic components, such as fillers, binders, stabilizers, rheology modifiers, and other additives, including one or more of alumina, silica, non-zeolite silica alumina, titania, zirconia, ceria.

The catalyst composition can comprise pore-forming agents such as graphite, cellulose, starch, polyacrylate, and polyethylene, and the like. These additional components do not necessarily catalyze the desired reaction, but instead improve the catalyst's effectiveness, for example, by increasing its operating temperature range, increasing contact surface area of the catalyst, increasing adherence of the catalyst to a substrate, etc.

The washcoat loading can be >0.3 $g/in^3$, such as >1.2 $g/in^3$, >1.5 $g/in^3$, >1.7 $g/in^3$ or >2.00 $g/in^3$, and preferably <3.5 $g/in^3$, such as <2.5 $g/in^3$.

The washcoat can be applied to a substrate in a loading of about 0.8 to 1.0 $g/in^3$, 1.0 to 1.5 $g/in^3$, or 1.5 to 2.5 $g/in^3$.

Catalyst Articles

Two of the most common substrate designs are honeycomb and plate. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch. The honeycomb flow-through monolith can have an average internal wall thickness of about 0.18 to about 0.35 mm, preferably about 0.20 to about 0.25 mm. For certain other applications, the honeycomb flow-through monolith preferably has a low cell density of about 150 to about 600 cells per square inch, more preferably about 200 to about 400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate.

Plate-type catalysts generally have lower pressure drops and are less susceptible to plugging and fouling than the honeycomb types. This can be advantageous in high efficiency stationary applications, but plate configurations can be much larger and more expensive. A Honeycomb configuration is typically smaller than a plate type, which is an advantage in mobile applications, but has higher pressure drops and plug more easily.

The plate substrate can be constructed of metal, preferably corrugated metal.

Another aspect of the invention is a catalyst article made by a process described herein.

The catalyst article can be produced by a process that includes the steps of applying a metal-promoted LTA zeolite composition, preferably as a washcoat, to a substrate as a layer either before or after at least one additional layer of another composition for treating exhaust gas has been applied to the substrate. The one or more catalyst layers on the substrate, including the metal-promoted LTA catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

The LTA catalyst with iron, manganese or a combination thereof, can be disposed on the substrate as a first layer and another composition, such as an oxidation catalyst, reduction catalyst, scavenging component, or $NO_x$ storage component, is disposed on the substrate as a second layer.

The LTA catalyst with iron, manganese or a combination thereof, can be disposed on the substrate as a second layer and another material, such as such as an oxidation catalyst, reduction catalyst, scavenging component, or $NO_x$ storage component, is disposed on the substrate as a first layer. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer.

The second layer can be applied to an inert substrate as a bottom layer and the first layer is top layer that is applied over the second layer as a consecutive series of sub-layers. In this configuration, the exhaust gas penetrates and contacts the first layer, before contacting the second layer, and subsequently returns through the first layer to exit the catalyst component.

The first layer can be a first zone disposed on an upstream portion of the substrate and the second layer can be disposed on the substrate as a second zone, wherein the second zone is downstream of the first.

A catalyst article can be produced by a process that includes the steps of applying a metal-promoted LTA zeolite catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the metal-promoted LTA zeolite catalyst composition can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components can be designed to perform more than one function. For example, applying an SCR catalyst to a wall-flow filter substrate instead of a flow-through substrate serves to reduce the overall size of an exhaust treatment system by allowing one substrate to serve two functions: catalytically reducing $NO_x$ concentration in the exhaust gas and mechanically removing soot from the exhaust gas.

The substrate can be a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. The efficiency can be from about 75 to about 99%, about 75 to about 90%, about 80 to about 90%, or about 85 to about 95%. The efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which one or more of pores, void, and channels, are joined to form continuous paths through a porous substrate from the inlet face to the outlet face. In contrast to pore interconnectivity, pores, voids, and channels can only have a single opening on only the inlet or the outlet face, or they can have two or more openings, each of which is one on either the inlet or the outlet face. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency of filtration by the substrate per se, by promotion of a soot cake layer on the surface of the substrate, or a combination of both of these. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

An extruded solid body containing an iron, manganese or a combination thereof containing LTA catalyst can be produced by blending the LTA zeolite and the extra-framework metal (either separately or together as a metal-exchanged zeolite), a binder, an optional organic viscosity-enhancing compound into a homogeneous paste which is then added to a binder/matrix component or a precursor thereof and optionally one or more of stabilized ceria, and inorganic fibers. The blend can be compacted in a mixing or kneading apparatus or an extruder. The mixtures can have organic additives such as binders, pore formers, plasticizers, surfactants, lubricants, and dispersants as processing aids to enhance wetting and therefore produce a uniform batch. The resulting material can then be molded, in particular using an extrusion press or an extruder with n extrusion die. The resulting moldings can be dried and calcined. The organic additives are "burnt out" of the zeolite during calcinations of the extruded solid body. An LTA zeolite catalyst comprising extra-framework iron, manganese or a combination thereof can also be washcoated or otherwise applied to the extruded solid body as one or more sub-layers that reside on the surface or penetrate wholly or partly into the extruded solid body. Alternatively, an LTA zeolite comprising extra-framework iron, manganese or a combination thereof can be added to a mixture of other components described above prior to extrusion.

Extruded solid bodies can contain an iron, manganese or a combination thereof containing LTA zeolite. These extruded solid bodies can generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The channels in the extruded solid body can have any desired cross section, such as circular, oval, square, triangular and hexagonal. Channels at a first, upstream end can be blocked, e.g. with a suitable ceramic cement, and channels not blocked at the first, upstream end can be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The binder/matrix, which can be in the form of a paste before being extruded, can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina (i.e., alpha alumina, beta alumina, chi alumina, eta alumina, rho alumina, kappa alumina, theta alumina, delta alumina), lanthanum beta alumina and mixtures of any two or more such aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder, such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the metal-promoted LTA zeolite is dispersed throughout, and preferably evenly throughout, the entire extruded catalyst body.

The above extruded solid bodies can be made into a wall-flow filter having a porosity of from 30-80%, such as from 40-70%. Porosity and pore volume and pore radius can be measured using for example, mercury intrusion porosimetry.

The iron, manganese or a combination thereof containing LTA catalyst described herein can promote the reaction of a reductant, preferably ammonia, with nitrogen oxides to selectively form elemental nitrogen ($N_2$) and water ($H_2O$). The catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

The iron, manganese or a combination thereof containing LTA catalyst described herein can also promote the oxidation of ammonia. The catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). The iron, manganese or a combination thereof containing LTA zeolite catalyst can be disposed as a top layer over an oxidative under-layer, wherein the under-layer comprises a platinum group metal (PGM) catalyst or a non-PGM catalyst. Preferably, the catalyst in the underlayer is disposed on a high surface area support, including but not limited to alumina.

SCR and AMOX operations can performed in series, wherein both processes utilize a catalyst comprising the metal-promoted LTA zeolite described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

A method for the reduction of $NO_x$ compounds or oxidation of $NH_3$ in a gas comprises contacting the gas with a catalyst composition described herein for the catalytic reduction of $NO_x$ for a time sufficient to reduce the level of $NO_x$ and/or $NH_3$ in the gas.

The catalyst article can have an ammonia slip catalyst disposed downstream of a selective catalytic reduction (SCR) catalyst. The ammonia slip catalyst can oxidize at least a portion of any nitrogenous reductant that is not consumed by the selective catalytic reduction process. The ammonia slip catalyst can be disposed on the outlet side of a wall flow filter and an SCR catalyst can be disposed on the upstream side of a filter.

The ammonia slip catalyst can be disposed on the downstream end of a flow-through substrate and an SCR catalyst can be disposed on the upstream end of the flow-through substrate.

The ammonia slip catalyst and SCR catalyst can be disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

One or both of the SCR and AMOX process can be performed at a temperature of at least 100° C. The process(es) can occur at a temperature from about 150° C. to about 750° C., from about 175 to about 550° C., from about 175 to about 400° C.

One or both of the SCR and AMOX process can be performed at a temperature range from about 450 to about 900° C., about 500 to about 750° C., about 500 to about 650° C., about 450 to about 550° C., or about 650 to about 850° C.

Temperatures greater than 450° C. are particularly useful for treating exhaust gases from a heavy or light duty diesel engine that is equipped with an exhaust system comprising diesel particulate filters (optionally catalyzed) which are regenerated actively, e.g. by injecting hydrocarbon into the exhaust system upstream of the filter, wherein the LTA zeolite catalyst described herein is located downstream of the filter.

In another aspect of the invention, provided are methods for at least one of the reduction of $NO_2$ compounds and the oxidation of $NH_3$ in a gas, which comprise contacting the gas with a catalyst comprising the LTA zeolite described herein for a time sufficient to reduce the level of $NO_2$ compounds in the gas. These methods can comprise one or more of the following steps: (a) at least one of accumulating and combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to at least one of (i) oxidize one or more of the hydrocarbon based soluble organic fraction (SOF) and carbon monoxide into $CO_2$, (ii) oxidize NO into $NO_2$, which in turn, can be used to oxidize particulate matter in particulate filter; and (iii) reduce the particulate matter (PM) in the exhaust gas; (e) contacting the exhaust gas with one or more flow-through SCR catalyst containing device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All, or at least a portion, of the nitrogen-based reductant, particularly $NH_3$, for consumption in the SCR process can be supplied by a NOx adsorber catalyst (NAC), a lean NOx trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal can be preferably present at about 10 to about 200 $g/ft^3$, such as 20 to 60 $g/ft^3$. Alternatively, the precious metal of the catalyst can be characterized by the average concentration which can be from about 40 to about 100 $grams/ft^3$.

During periodically rich regeneration events, $NH_3$ can be generated over a $NO_x$ adsorber catalyst. An SCR catalyst downstream of the $NO_x$ adsorber catalyst can improve the overall system $NO_x$ reduction efficiency. In a combined system, the SCR catalyst can store $NH_3$ released from the NAC catalyst during rich regeneration events and utilizes the stored $NH_3$ to selectively reduce some, or all, of the $NO_x$ that slips through the NAC catalyst during the normal lean operation conditions.

Methods for treating exhaust gas as described herein can be performed on an exhaust gas derived from a combustion process, such as from an internal combustion engine (whether mobile or stationary), a gas turbine and coal or oil fired power plants. The method can also be used to treat gas from industrial processes such as refining, from refinery heaters and boilers, furnaces, the chemical processing industry, coke ovens, municipal waste plants and incinerators, etc. The method can be used for treating exhaust gas from a vehicular lean burn internal combustion engine, such as a diesel engine, a lean-burn gasoline engine or an engine powered by liquid petroleum gas or natural gas.

Another aspect of the invention is a system for treating exhaust gas generated by combustion process, such as from an internal combustion engine (whether mobile or stationary), a gas turbine, coal or oil fired power plants, and the like. Such systems include a catalytic article comprising the metal-promoted LTA zeolite described herein and at least one additional component for treating the exhaust gas, wherein the catalytic article and at least one additional component are designed to function as a coherent unit.

The system can comprise a catalytic article comprising a zeolite having an LTA Framework Type where the zeolite has a silica-to-alumina ratio (SAR) of about 15 to about 70 and the zeolite comprises iron, manganese or a mixture of iron and manganese as an extra-framework metal as described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia can be present in exhaust gas entering the SCR catalyst calculated at 1:1 $NH_3/NO$ and 4:3 $NH_3/NO_2$.

The system can comprise an oxidation catalyst (e.g., a diesel oxidation catalyst (DOC)) for oxidizing nitrogen monoxide in the exhaust gas to nitrogen dioxide, where the oxidation catalyst can be located upstream of a point of metering the nitrogenous reductant into the exhaust gas.

The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. The at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

In the second aspect of the invention, a catalyst composition comprises:
a. a zeolite having an LTA Framework Type where the zeolite has a silica-to-alumina ratio (SAR) of about 15 to about 70;
b. about 0.5 to about 10, preferably about 1.5 to about 5, weight percent of iron, manganese or a mixture of iron and manganese, based on the total weight of the zeolite, as an extra-framework metal and
c. at least about 1.35 weight percent of cerium, based on the total weight of the zeolite, wherein the cerium is present in a form selected from exchanged cerium ions, monomeric ceria, oligomeric ceria, and combinations thereof, provided that the oligomeric ceria has a particle size of less than 5 µm.

The catalyst composition can comprise about 2 to about 3.5, about 2 to about 3, or about 2 to about 2.5, weight percent of exchanged iron, manganese, or a mixture of iron and manganese, based on the total weight of the zeolite.

The catalyst composition can comprise iron, manganese or a combination of iron and manganese in a ratio to Al in the zeolite of about 0.17 to about 0.24.

The composition can comprise about 1.35 to about 13.5, preferably about 2.7 to about 8.1, weight percent of cerium, based on the total weight of the zeolite.

The composition can be substantially free of Ti, TiO, Zr and ZrO.

A method for treating NOx comprises contacting an exhaust gas produced by a lean-burn combustion engine with a catalyst composition described above for this aspect of the invention at a temperature of about 200 to about 550° C. for a period of time necessary to achieve a NOx conversion of at least about 70%.

A catalyst composition comprises:
a. a zeolite having an LTA Framework Type where the zeolite has a silica-to-alumina ratio (SAR) of about 15 to about 70;
b. about 40 to about 400 $g/ft^3$ of iron, manganese or a mixture of iron and manganese as an extra-framework metal; and
c. at least about 50 $g/ft^3$ of cerium, wherein the cerium is present in a form selected from exchanged cerium ions, monomeric ceria, oligomeric ceria, and combinations thereof, provided that the oligomeric ceria has a particle size of less than 5 µm.

In the third aspect of the invention, a catalyst composition comprises a blend of two zeolites having an LTA Framework Type where the zeolite has a silica-to-alumina ratio (SAR) of about 15 to about 70, wherein the first molecular sieve has a mean crystal size of about 0.01 to 1 µm and the second molecular sieve has a mean crystal size of about 1 to about 5 µm, and wherein the first molecular sieve contains a first extra-framework metal, the second molecular sieve contains a second extra-framework metal, and wherein one of the first and second extra-framework metals comprises iron, manganese or a mixture of iron and manganese as an extra-framework metal, and the other of the first and second extra-framework metals are independently selected from the group consisting of antimony, bismuth, cesium, chromium, cobalt, copper, iron, manganese, molybdenum, nickel, niobium, tin, titanium, tungsten, vanadium, zinc, zirconium, and combinations thereof.

The iron, manganese or mixture of iron and manganese can be present in a total amount of from 0.5 to 10% of the weight of the zeolite.

The first and second exchanged metals can be iron.

The first molecular sieve can have a silica-to-alumina ratio of about 10 to 50 and the second molecular sieve a silica-to-alumina ratio of about 20 to 50.

The catalyst composition can comprise a blend of the first molecular sieve and the second molecular sieve.

At least one of the first molecular sieve and the second molecular sieve can be an extrudate.

The first extra-framework metal can be present in an amount of about 1 to about 5 wt % based on the total weight of the molecular sieve, and the second extra-framework metal can be present in amount sufficient to achieve a weight ratio of the first extra-framework metal and the second extra-framework metal of about 0.4:1.0 to about 1.5:1.0.

The first molecular sieve and the second molecular sieve can be present in a mole ratio of about 0.5:1:0 to about 1.5:1.0.

In the fourth aspect of the invention, a catalyst composition comprises:
a. a zeolite having an LTA Framework Type where the zeolite has a silica-to-alumina ratio (SAR) of about 15 to about 70;
b. about 0.5 to about 10, preferably about 1 to about 5, weight percent of a base metal ("$B_M$"), based on the total weight of the zeolite material, wherein the base metal is iron, manganese or a mixture of iron and manganese, and the base metal is disposed in the zeolite material as free and/or extra-framework exchanged metal, and c. an alkali or alkaline earth metal (collectively "$A_M$") disposed in the zeolite material disposed in the zeolite material as free and/or extra-framework exchanged metal, wherein the $B_M$ and $A_M$ are present, respectively, in a molar ratio of about 15:1 to about 1:1.

The alumina contains aluminum (Al) that is part of the zeolite framework and the catalyst composition can have a $(B_M+A_M)$:Al mole ratio of about 0.1 to about 0.4

The catalyst can have a molar ratio of $B_M$ to Al that is less than 0.25:1, preferably about 0.1 to about 0.24.

The catalyst can have a molar ratio of $B_M$ to $A_M$ that is about 10:1 to about 3:1.

The alkali or alkaline earth metal can be an alkali metal selected from the group consisting of Cs, Na, K and Rb.

The alkali or alkaline earth metal can be an alkaline earth metal selected from the group consisting of Ba, Ca, Mg and Sr.

The alkali or alkaline earth metal can be selected from the group consisting of Ca, K, and combinations thereof, and the $B_M$:Al can be present in a molar ratio about 0.17 to about 0.24.

The zeolite can have a mean crystal size of about 1 μm to about 5 μm.

The catalyst composition can further comprise: (d) about 1 to about 10 weight percent of cerium in the zeolite material, based on the total weight of the zeolite, wherein the cerium is present in a form selected from exchanged cerium ions, monomeric ceria, oligomeric ceria, and combinations thereof, provided that the oligomeric ceria has a particle size of less than 5 μm.

The catalyst composition can be substantially free of Zr, ZrO, Ti, and TiO.

A catalytically active washcoat comprises: (a) a catalyst composition a catalyst composition as described above for this aspect of the invention, and (b) one or more stabilizers and/or binders selected from ceria, alumina, silica, (non-zeolite) silica-alumina, naturally occurring clays, $TiO_2$, $ZrO_2$, and $SnO_2$, wherein the catalyst composition and the one or more stabilizers and/or binders are present together in a slurry.

A catalyst article comprises: (a) a catalyst composition as described above for this aspect of the invention, and b) a substrate, wherein the catalyst composition is disposed on the surface of the substrate, permeates at least a portion of the substrate, or a combination thereof.

The substrate can be a flow-through monolith or a wall-flow monolith.

A method for reducing $NO_x$ in an exhaust gas comprises: (a) contacting an exhaust gas stream derived from a lean-burn combustion process and containing $NO_x$ and a reducing agent with a catalyst composition as described above for this aspect of the invention; and (b) converting at a portion of the $NO_x$ to $N_2$ and $H_2O$.

In the fifth aspect of the invention, an SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal, wherein the zeolite comprises mesopores introduced by alkaline treatment, where the iron, manganese or a mixture of iron and manganese is present in a total amount of from 0.5 to 10% of the weight of the zeolite.

The SCR catalyst can comprise from 50 to 95 wt % of the zeolite based on the total weight of the SCR catalyst The catalyst can comprise an inorganic binder component. The inorganic binder component can comprise porous particles. The inorganic binder component can be catalytically activated.

The inorganic binder component can comprise particles coated with a catalytically active layer or converted at least partially into a zeolite framework structure with retention of their particle form.

The catalyst can be in the form of an extruded catalyst, preferably a honeycomb catalyst or a wall-flow filter.

A method for producing an SCR catalyst described above for this aspect of the invention comprises introducing the mesoporous into the small-pore catalytically active component by alkaline treatment. Preferably, the zeolite having an LTA framework does not comprise an extra-framework metal when the mesopores are introduced into the zeolite.

The method can further comprise introducing catalytically active metal ions into the zeolite in order to form catalytically active cells.

The zeolite, following the introduction of the mesopores, can be directly metal ion-exchanged or can be first converted into an intermediate form before the metal ion exchange takes place.

The method can comprise providing a formable catalyst composition and forming the formable catalyst composition into a shaped body, preferably by extrusion, and then introducing the mesopores into the shaped body.

In the sixth aspect of the invention, a catalyst for treating an exhaust gas comprises a blend of a first zeolite having an LTA Framework Type where the zeolite has a silica-to-alumina ratio (SAR) of about 15 to about 70 and the zeolite comprises iron, manganese or a mixture of iron and manganese as an extra-framework metal, where the iron, manganese or mixture thereof is present in a total amount of from 0.5 to 10% of the weight of the zeolite and a second zeolite having an LTA Framework Type primarily in at least one of $H^+$ form, $NH_4^+$ form, alkali metal form, or alkaline-earth metal form.

The second zeolite can comprise calcium.

The second zeolite can be essentially free of transition metals.

The second zeolite can be essentially free of non-framework metals.

The first zeolite and the second zeolite can have different silica-to-alumina ratios.

The first zeolite can have a lower silica-to-alumina ratio relative to the second zeolite.

The first zeolite and the second zeolite can independently have a silica-to-alumina ratio of about 10 to about 35.

The first and second zeolites can have the same silica-to-alumina ratio.

The second and first zeolites can be present in a relative ratio of about 0.1 to about 1.

A catalytic article for treating an exhaust gas comprising a porous honeycomb substrate containing a catalyst described above for this aspect of the invention.

A method for treating an exhaust gas comprising contacting an exhaust gas stream containing $NO_x$ with a reductant in the presence of a catalyst described above for this aspect of the invention; wherein the contacting selectively reduces at least a portion of the $NO_x$ to $N_2$ and water.

The contacting can occur at a temperature of about 150-600° C.

In the seventh aspect of the invention, an ammonia slip catalyst can comprise a first layer comprising an SCR catalyst comprising a zeolite having an LTA Framework Type, the zeolite having an LTA Framework Type where the zeolite has a silica-to-alumina ratio (SAR) of about 15 to about 70 and the zeolite comprises iron, manganese or a mixture of iron and manganese as an extra-framework metal, and a second layer comprising a perovskite, wherein the first layer is arranged to contact an exhaust gas before the second layer.

Iron, manganese or a mixture of iron and manganese can be present in a total amount of from 0.5 to 10% of the weight of the zeolite, The first layer can be an overlayer located over the second layer.

The first layer can be supported on a first support material and the second layer can be supported on a second support material.

The perovskite can have the formula $ABO_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr).

The perovskite can have the formula $LaCoO_3$, $LaMnO_3$, $La_YSr_{(1-Y)}CoO_3$, or $La_YSr_{(1-Y)}MnO_3$, where Y=0.6 to 1.0, inclusive. Preferably, the perovskite has the formula $La_YSr_{(1-Y)}CoO_3$, where Y=0.6 to 1.0, inclusive.

Perovskite can be present at a concentration of about 0.2 to about 5.0 $g/in^3$.

The SCR catalyst can be present at a concentration of about 0.2 to about 5.0 $g/in^3$.

The ammonia slip catalyst can have at least 70%, preferably at least 80%, $N_2$ selectivity at a temperature between about 250° C. and about 650° C.

A method of preparing an ammonia slip catalyst comprising a first layer comprising an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal and a second layer comprising a perovskite, wherein the first layer is arranged to contact an exhaust gas before the second layer and the first layer is an overlayer located over the second layer, the method comprises:
 (a) forming a bottom layer on a substrate by applying onto a substrate a bottom layer washcoat comprising a perovskite,
 (b) drying the bottom layer washcoat on the substrate,
 (c) calcining the bottom layer washcoat on the substrate;
 (d) forming a top layer positioned over the bottom layer by applying a top layer washcoat comprising an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal over the calcined bottom layer formed in step (c),
 (e) drying the top layer washcoat on the calcined bottom layer on the substrate, and
 (f) calcining the top layer washcoat on the bottom layer washcoat on the substrate.

The perovskite can have the formula $ABO_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr).

The perovskite can have the formula $LaCoO_3$, $LaMnO_3$, $La_YSr_{(1-Y)}CoO_3$, or $La_YSr_{(1-Y)}MnO_3$, where Y=0.6 to 1.0, inclusive.

The perovskite can have the formula $La_YSr_{(1-Y)}CoO_3$, where Y=0.6 to 1.0, inclusive, and the SCR catalyst comprises a copper or iron SAPO-34 or a copper or iron exchanged molecular sieve.

The perovskite can be present at a concentration of about 0.2 to about 5.0 $g/in^3$.

The SCR catalyst can be present at a concentration of about 0.2 to about 5.0 $g/in^3$.

A method for reducing the concentration of ammonia in an exhaust gas stream generated by a combustion source, the method comprising contacting an exhaust gas stream containing ammonia with an ammonia slip catalyst comprising a first layer comprising an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal, and a second layer comprising a perovskite, wherein the first layer is arranged to contact an exhaust gas before the second layer.

The first layer can be an overlayer located over the second layer.

The first layer can be supported on a first support material and the second layer can be supported on a second support material.

Perovskite can have the formula $ABO_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr).

Perovskite can have the formula $LaCoO_3$, $LaMnO_3$, $La_YSr_{(1-Y)}CoO_3$, or $La_YSr_{(1-Y)}MnO_3$, where Y=0.6 to 1.0, inclusive.

The perovskite can have the formula $La_YSr_{(1-Y)}CoO_3$, where Y=0.6 to 1.0, inclusive, and the SCR catalyst comprises a copper or iron SAPO-34 or a copper or iron exchanged molecular sieve.

The perovskite can be present at a concentration of about 0.2 to about 5.0 $g/in^3$.

The SCR catalyst can be present at a concentration of about 0.2 to about 5.0 $g/in^3$.

The ammonia slip catalyst can have at least 70% $N_2$ selectivity at a temperature between about 250° C. and 650° C.

The ammonia slip catalyst can have at least 90% $N_2$ selectivity at a temperature between about 250° C. and 650° C.

A system comprising at least one SCR catalyst, a perovskite and a platinum group metal, wherein at least a portion of the SCR catalyst is in an overlayer arranged over a layer comprising the perovskite, and at least a portion of the SCR catalyst is in an overlayer arranged over a layer comprising the platinum group metal, where the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

The SCR catalyst in the overlayer arranged over a layer comprising the perovskite, and the SCR catalyst in an overlayer arranged over a layer comprising the platinum group metal can be the same SCR catalyst.

The SCR catalyst in the overlayer arranged over a layer comprising the perovskite, and the SCR catalyst in an overlayer arranged over a layer comprising the platinum group metal can be in a single layer over both the perovskite layer and the platinum group metal layer.

The SCR catalyst in the overlayer arranged over a layer comprising the perovskite, and the SCR catalyst in an overlayer arranged over a layer comprising the platinum group metal can be located on separate catalyst articles located adjacent to each other such that the flow of exhaust gas first passes through an article comprising the SCR catalyst in the overlayer arranged over a layer comprising the perovskite and then passes through an article comprising the SCR catalyst in the overlayer arranged over a layer comprising the platinum group metal.

A catalyst article can comprise: (a) a wall flow monolith having an inlet face end and an outlet face and an axis of gas flow from the inlet face to the outlet face; (b) a first composition comprising a first layer comprising a first SCR catalyst and a second layer comprising a perovskite, wherein the first layer is arranged to contact an exhaust gas before the second layer and (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein the first composition is disposed proximal to the inlet face, and the second zone is disposed proximal to the outlet face, wherein at least one of the SCR catalysts comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

The first SCR catalyst and the second SCR catalyst can be the same SCR catalyst.

The first SCR catalyst and the second SCR catalyst can be different SCR catalysts.

One of the first and second SCR catalyst can comprise an oxide of a base metal, a molecular sieve, a metal exchanged molecular sieve or a mixture thereof.

The base metal can be selected from the group consisting of cerium (Ce), chromium (Cr), cobalt (Co), copper (Cu), iron (Fe), manganese (Mn), molybdenum (Mo), nickel (Ni), tungsten (W) and vanadium (V), and mixtures thereof.

One of the first SCR catalyst and the second SCR catalyst can comprise a metal exchanged molecular sieve where the metal is selected from the group consisting of calcium, cobalt, copper, gallium, indium, iron, nickel, silver and tin.

The molecular sieve or the metal exchanged molecular sieve can be a zeolite.

The molecular sieve or the metal exchanged molecular sieve can be small pore, medium pore or large pore or a mixture thereof.

Perovskite can have the formula $ABO_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr).

The perovskite can have the formula $LaCoO_3$, $LaMnO_3$, $La_YSr_{(1-Y)}CoO_3$, or $La_YSr_{(1-Y)}MnO_3$, where Y=0.6 to 1.0, inclusive.

The perovskite can have the formula $La_YSr_{(1-Y)}CoO_3$, where Y=0.6 to 1.0, inclusive.

The perovskite can be present at a concentration of about 0.2 to about 5.0 $g/in^3$.

The first and the second SCR catalyst can each be present at a concentration of about 0.2 to about 5.0 $g/in^3$.

The catalyst article can have at least 70%, preferably at least 80%, $N_2$ selectivity at a temperature between about 250° C. and about 650° C.

An engine exhaust gas treatment system comprising: (a) a catalyst article described above for this aspect of the invention; and (b) a source of ammonia or urea upstream of the catalytic article.

A method for treating an exhaust gas comprises. contacting an exhaust gas stream having a concentration of NOx with a nitrogenous reductant at a temperature of about 150° C. to about 750° C. in the presence of a catalyst article described above for this aspect of the invention.

A method for reducing NOx in an exhaust gas comprises contacting the gas with a catalyst article described above for this aspect of the invention for a time and temperature sufficient to reduce the level of NOx compounds in the gas.

In the eighth aspect of the invention, a catalyst composition comprises a zeolite having an LTA Framework Type where the zeolite has a silica-to-alumina ratio (SAR) of about 15 to about 70, about 0.5-10 weight percent of an ion-exchanged metal ($T_M$) selected from iron, manganese or a mixture of iron and manganese, based on the total weight of the molecular sieve, and about 0.5-5 weight percent nickel, based on the total weight of the molecular sieve, wherein the transition metal and nickel are present in a $T_M$:Ni ratio of about 10:1 to about 1:2.

The majority of the nickel can be present as an extra-framework metal.

The molecular sieve can be composed of crystals, and the transition metal and the nickel are present in a weight percentage as measured by XPS that is within 10% of their weight percentage as measured by XRF.

The zeolite can be essentially free of non-aluminum framework metals.

The zeolite can have a mean crystal size of about 0.5 to 5 microns.

The zeolite can be an SCR catalyst and can be effective for reducing NOx to $N_2$ in the presence of a reductant.

A catalyst article comprises a substrate coated with a catalyst composition described above for this aspect of the invention.

The substrate can be a metal flow-through substrate, a honeycomb flow-through substrate, a honeycomb wall-flow filter, or a honeycomb partial filter.

The catalyst article can further comprise a second coating comprising an oxidation catalyst.

A method for treating an exhaust gas can comprise contacting a gas comprising NOx and a reductant with a catalyst described above for this aspect of the invention to catalytically reduce at least a portion of the NOx to $N_2$. The exhaust gas can further comprises a source of sulfur, preferably the exhaust gas comprises at least 10 ppm sulfur.

In the ninth aspect of the invention, a catalyst comprises a combination of platinum on a support with low ammonia storage and a first SCR catalyst, and optionally a second and/or third SCR catalyst, wherein at least one of the SCR catalysts comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

The combination can be a blend of platinum on a support with low ammonia storage with a first SCR catalyst.

The combination can be a bi-layer having a top layer comprising a first SCR catalyst and a bottom layer comprising platinum on a support with low ammonia storage, where the bottom layer is positioned on a substrate or on a third SCR catalyst located between the bottom layer and the substrate.

The support with low ammonia storage can be a siliceous support comprising a silica or a zeolite with silica-to-alumina ratio of $\geq 100$, preferably $\geq 500$.

The ratio of the amount of the first SCR catalyst to the amount of platinum on the support with low ammonia storage can be in the range of 0:1 to 300:1, preferably in the range of 3:1 to 300:1, inclusive, based on the weight of these components.

The first SCR catalyst can be a Cu-SCR catalyst comprising copper and a molecular sieve or a Fe-SCR catalyst comprising iron and a molecular sieve.

Platinum can be present in the catalyst from at least one of: (a) 0.01-0.3 wt. %, (b) 0.03-0.2 wt. %, (c) 0.05-0.17 wt. %, and (d) 0.07-0.15 wt. %, inclusive, relative to the weight of the support of platinum+the weight of platinum+the weight of the first SCR catalyst in the blend.

Platinum can be present in the catalyst at from 0.1 wt. % to 2 wt. %, inclusive, preferably from 0.1 to 1 wt. %, inclusive, more preferably from 0.1 wt. % to 0.5 wt. %, inclusive, relative to the weight of the layer.

The catalyst can further comprise a second SCR catalyst, where the second SCR catalyst is located adjacent to the blend of platinum on the support with low ammonia storage with the first SCR catalyst and at least partially overlaps the blend of platinum on the support with low ammonia storage and the first SCR catalyst.

The catalyst described above comprising a second SCR catalyst 9 can further comprise a third SCR catalyst, where the third SCR catalyst is located adjacent to the blend of platinum on the support with low ammonia storage with the first SCR catalyst and the blend of platinum on the support with low ammonia storage with the first SCR catalyst at least partially overlaps the third SCR catalyst.

The catalyst can provide an improvement in $N_2$ yield from ammonia at a temperature from about 250° C. to about 350° C. compared to a catalyst comprising a comparable formulation in which the first SCR catalyst is present as a first layer and the supported platinum is present in a second layer and gas comprising $NH_3$ passes through the first layer before passing through the second layer.

The catalyst can provide at least one of: (a) an improvement in $N_2$ yield from ammonia at a temperature from about 350° C. to about 450° C., and (b) a reduction in NOx formation at a temperature from about 350° C. to about 450° C., compared to a catalyst comprising a comparable formulation in which the first SCR catalyst is present as a first layer and the supported platinum is present in a second layer and gas comprising $NH_3$ passes through the first layer before passing through the second layer.

The catalyst can provide reduced $N_2O$ formation from $NH_3$ compared to a catalyst comprising a comparable formulation in which the first SCR catalyst is present as a first layer and the supported platinum is present in a second layer and gas comprising $NH_3$ passes through the first layer before passing through the second layer.

A method of improving the $N_2$ yield from ammonia in an exhaust gas at a temperature from about 250° C. to about 350° C. can comprise contacting an exhaust gas comprising ammonia with a catalyst described above for this aspect of the invention, where the improvement in yield is about 5% to about 10% compared to a catalyst comprising a comparable formulation in which the first SCR catalyst is present as a first layer and the platinum on a support that stores ammonia is present in a second layer and gas comprising $NH_3$ passes through the first layer before passing through the second layer.

A method of reducing $N_2O$ formation from $NH_3$ in an exhaust gas comprises contacting an exhaust gas comprising ammonia with a catalyst described above for this aspect of the invention, where the reduction in $N_2O$ formation is about 20% to about 40% compared to a catalyst comprising a comparable formulation in which the first SCR catalyst is present as a first layer and the platinum on a support that stores ammonia is present in a second layer and gas comprising $NH_3$ passes through the first layer before passing through the second layer.

In the tenth aspect of the invention, a catalyst article for treating exhaust gas comprises: (a) an oxidation catalyst comprising at least one noble metal on a $WO_3$—$TiO_2$ support, wherein the support contains about 1 to about 20 weight percent $WO_3$ based on the combined weight of the $WO_3$ and $TiO_2$, (b) a catalyst for selectively reducing $NO_x$ in the presence of oxygen and/or for storing $NH_3$, the catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal; and (c) a substrate;

wherein the oxidation catalyst is disposed on or within the substrate and the catalyst for selectively reducing $NO_x$ is disposed on or within the substrate, but is physically separate from the oxidation catalyst.

The support can comprise about 2 to about 10 weight percent $WO_3$ based on the combined weight of the $WO_3$ and $TiO_2$.

The oxidation catalyst can be essentially free of Al, Ce, Mo, Si, V and Zr.

The at least one noble metal can be Au, Ag, Pt, Pd, Rh, or combination thereof, preferably Pt, Pd, or a combination thereof.

The oxidation catalyst can consist of the noble metal on the $WO_3$—$TiO_2$ support. The catalyst article can further comprise a washcoat, wherein the washcoat contains the oxidation catalyst.

The oxidation catalyst can be disposed on the substrate as a first washcoat layer and the second catalyst can be disposed on the substrate as a second washcoat layer, wherein the first washcoat layer completely covers, but is separate from, the second layer.

A method for treating an exhaust gas comprises: (a) flowing an exhaust gas containing $NH_3$ through a substrate having an oxidation catalyst comprising a noble metal on a $WO_3$—$TiO_2$ support, a zeolite having an LTA Framework Type where the zeolite has a silica-to-alumina ratio (SAR) of about 15 to about 70 and the zeolite comprises iron, manganese or a mixture of iron and manganese as an extra-framework metal, wherein the support contains about 1 to about 20 weight percent $WO_3$ based on the combined weight of the $WO_3$ and $TiO_2$, and (b) oxidizing at least a portion of the $NH_3$ to produce $NO_x$ and $H_2O$.

The flowing exhaust gas can contain at least 500 ppm $SO_x$.

A method for regenerating a catalytic article used to treat exhaust gas comprises:
a. flowing an exhaust gas through a substrate having an oxidation catalyst and an SCR catalyst, wherein the exhaust gas contains $SO_x$ prior to entering the substrate, and wherein the oxidation catalyst comprises a noble metal on a $WO_3$—$TiO_2$ support and the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal, wherein the support contains about 1 to about 20 weight percent $WO_3$ based on the combined weight of the $WO_3$ and $TiO_2$;
b. absorbing at least a portion of the $SO_x$ in the catalyst layer; and
c. regenerating the catalyst after the catalyst layer adsorbs at least 5 g/L of the $SO_x$.

A method for regenerating a catalytic article used to treat exhaust gas comprises:
a. flowing an exhaust gas through a substrate having an oxidation catalyst, wherein the exhaust gas contains $SO_x$ prior to entering the substrate, and wherein the oxidation catalyst comprises a noble metal on a $WO_3$—$TiO_2$ support, wherein the support contains about 1 to about 20 weight percent $WO_3$ based on the combined weight of the $WO_3$ and $TiO_2$;
b. absorbing at least a portion of the $SO_x$ in the catalyst layer; and
c. regenerating the catalyst at a temperature of not greater than 350° C.

In the 11th aspect of the invention, a catalyst article for treating exhaust gas comprises a substrate having a first catalyst layer disposed on and/or within the substrate and a second catalyst layer coated over the first catalyst layer; wherein the first catalyst layer comprises a first oxidation catalyst and the second catalyst layer contains a mixture of (i) a second oxidation catalyst consisting of supported palladium and (ii) a catalyst for selectively reducing $NO_x$ and/or storing $NH_3$ comprising a zeolite having an LTA Framework Type where the zeolite has a silica-to-alumina ratio (SAR) of about 15 to about 70 and the zeolite comprises iron, manganese or a mixture of iron and manganese as an extra-framework metal; wherein the first and second oxidation catalysts are different formulations.

The second catalyst layer can be essentially free of Ag, Au, Ir, Os, Pt, Rh and Ru.

The first oxidation catalyst can be supported noble metal.

The first oxidation catalyst can be Pt supported on metal oxide particles or a mixture of Pt and Pd supported on metal oxide particles.

The substrate can be a flow-through honeycomb having a wall porosity of about 50 to about 65%.

The majority of the first catalyst layer can be disposed within the substrate walls and a majority of the second catalyst layer can be disposed on the surface of the substrate walls.

A catalyst article for treating an exhaust gas comprises:
a. a substrate;
b. a first oxidation catalyst layer disposed on and/or within the substrate;
c. a second catalyst layer disposed over the first catalyst layer, wherein the second layer contains a catalyst for selectively reducing $NO_x$ and/or storing $NH_3$, where the catalyst for selectively reducing $NO_x$ and/or storing $NH_3$ comprises a zeolite having an LTA Framework Type where the zeolite has a silica-to-alumina ratio (SAR) of about 15 to about 70 and the zeolite comprises iron, manganese or a mixture of iron and manganese as an extra-framework metal, and
d. a third catalyst layer disposed over the second catalyst layer, wherein the third catalyst layer comprises a second oxidation catalyst consisting of supported Pd;
wherein the first and second oxidation catalysts are different formulations.

The third catalyst layer can be essentially free of ruthenium, rhenium, rhodium, silver, osmium, iridium, platinum, gold, alkali and alkaline earth metals, and transition metals, except transition metals in the form of a metal oxide particle support for the palladium.

A catalyst article for treating an exhaust gas comprises:
a. a substrate;
b. a first oxidation catalyst layer disposed on and/or within the substrate;
c. a second catalyst layer disposed over the first catalyst layer, wherein the second layer contains a catalyst for selectively reducing $NO_x$ and/or storing $NH_3$; where the catalyst for selectively reducing $NO_x$ and/or storing $NH_3$ comprises a zeolite having an LTA Framework Type where the zeolite has a silica-to-alumina ratio (SAR) of about 15 to about 70 and the zeolite comprises iron, manganese or a mixture of iron and manganese as an extra-framework metal, and
d. a third catalyst layer disposed upstream of the first and second catalyst layers, wherein the third catalyst layer comprises a second oxidation catalyst consisting of supported Pd;
wherein the first and second oxidation catalysts are different formulations.

A system for treating exhaust gas comprises:
a. an exhaust gas manifold;
b. a sub-system for introducing a nitrogenous-based reductant into the exhaust gas;
c. an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal; and
d. a substrate having a first catalyst layer disposed on and/or within the substrate and a second catalyst layer coated over the first catalyst layer; wherein the first catalyst layer comprises a first oxidation catalyst and the second catalyst layer contains a mixture of (i) a second oxidation catalyst consisting of supported palladium and (ii) a catalyst for selectively reducing $NO_x$ and/or storing $NH_3$; and wherein the first and second oxidation catalysts are different formulations;
wherein components (a)-(d) are in serial fluid communication and are, respectively, in consecutive order from upstream to downstream; and wherein the system is free of oxidation catalysts between the substrate and the exhaust gas manifold.

A system for treating exhaust gas comprises:
a. a first oxidation catalyst for producing an $NO/NO_2$ ratio of about 4:1 to about 1:3;
b. a sub-system for introducing a nitrogenous-based reductant into the exhaust gas;
c. an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal;
d. an injector for introducing fuel into the exhaust gas;

e. a second flow-through monolith having a second catalyst layer disposed on and/or within the substrate and a first catalyst layer coated over at least a portion of a second catalyst layer, wherein the first catalyst layer contains a mixture of (i) a first oxidation catalyst consisting of palladium on a first support and (ii) a catalyst for selectively reducing $NO_x$ and/or storing $NH_3$, and the second catalyst layer comprises a second oxidation catalyst; wherein the substrate is in fluid communication with the exhaust gas manifold; and f. a diesel particulate filter;

wherein components (a)-(e) are, respectively, in consecutive order from upstream to downstream.

A method for treating exhaust gas comprising contacting an exhaust gas containing $NH_3$ with a catalyst article comprising a substrate having a first catalyst layer disposed on and/or within the substrate and a second catalyst layer coated over the first catalyst layer; wherein the first catalyst layer comprises a first oxidation catalyst and the second catalyst layer contains a mixture of (i) a second oxidation catalyst consisting of supported palladium and (ii) a catalyst for selectively reducing NO and/or storing $NH_3$ comprising a zeolite having an LTA Framework Type where the zeolite has a silica-to-alumina ratio (SAR) of about 15 to about 70 and the zeolite comprises iron, manganese or a mixture of iron and manganese as an extra-framework metal; and wherein the first and second oxidation catalysts are different formulations; wherein the contacting (a) stores at least a portion of the $NH_3$ in the second catalyst layer; (b) oxidizes at least a portion of the $NH_3$ to form $N_2$ and/or secondary $NO_x$; and (c) selectively reducing at least a portion of the secondary NOx with the stored $NH_3$ to produce $N_2$ and $H_2O$.

The exhaust gas can further comprise CO and/or hydrocarbons; and wherein the contacting oxidizes at least a portion of the CO and/or hydrocarbons to form $CO_2$, and optionally $H_2O$.

The method can further comprise the steps of:

d. introducing fuel into the exhaust gas upstream of the catalyst article described above for this aspect of the invention;

e. contacting the fuel with the catalyst article to oxidize the fuel and produce a heated exhaust gas; and f. using the heated exhaust gas to regenerate a downstream particulate filter.

In the 12th aspect of the invention, a catalyst article can comprise: (a) a high porosity substrate comprising platinum, palladium or a mixture thereof in the wall of the high porosity substrate and (b) an SCR catalyst coating on a wall of the high porosity substrate, where the platinum, palladium or mixture thereof is present in the wall of the high porosity support as a metal, or as a supported platinum, palladium or a mixture thereof, and the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

The iron, manganese or a mixture of iron and manganese can be present in a total amount of from 0.5 to 10% of the weight of the zeolite.

The platinum, palladium or a mixture thereof, or the supported platinum, palladium or a mixture thereof, can also be present as a coating on the wall of the high porosity support.

The SCR catalyst coating can be present on both sides of at least a portion of a wall of the high porosity substrate.

The platinum, palladium or a mixture thereof can be present on both sides of at least a portion of a wall of the high porosity substrate.

The catalyst article can have an increase in backpressure compared to the backpressure of the untreated high porosity substrate of less than or equal to 100%.

The catalyst article can have a loss of SCR catalyst coating on the wall of the high porosity support of less than 2%.

The high porosity substrate can have a porosity of about 40% to about 80%.

The catalyst article can comprise from about 0.1 wt % to about 1 wt % of platinum or about 0.1 wt % to about 2 wt % of palladium.

The catalyst article can further comprise at least one base metal promoter. The at least one base metal promoter can be selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof.

The catalyst article can convert NOx to $N_2$ with a greater selectivity than a comparable article comprising a substrate having a porosity less than the porosity of a high porosity substrate.

A method of purifying an exhaust gas comprising NOx, comprises contacting an exhaust gas comprising NOx with a catalytic article described above for this aspect of the invention.

The exhaust gas comprising NOx can be contacted with a catalytic article described above for this aspect of the invention at a temperature of about 150° C. to about 550° C.

The method can convert NOx to $N_2$ and the $N_2$ selectivity is greater than the $N_2$ selectivity from a comparable article comprising a substrate having a porosity less than the porosity of a high porosity substrate.

In the 13th aspect of the invention, a catalyst article comprises an SCR catalyst and a NOx adsorber catalyst, wherein the SCR catalyst comprises a zeolite having an LTA Framework Type where the zeolite has a silica-to-alumina ratio (SAR) of about 15 to about 70 and the zeolite is ion-exchanged with iron, manganese or a mixture of iron and manganese and the NOx adsorber catalyst comprises palladium on ceria or a metal-containing molecular sieve, wherein the metal is selected from the group consisting of cerium, chromium, cobalt, copper, iron, lanthanum, manganese, molybdenum, nickel, niobium, palladium, tungsten, silver vanadium, and zinc, and mixtures thereof.

The metal in the NOx adsorber catalyst can be cobalt, manganese, palladium, or zinc, preferably palladium or zinc.

The NOx adsorber catalyst can comprise a palladium containing molecular sieve the molecular sieve comprises a silicoaluminophosphate and the silicoaluminophosphate comprises between 5% and 15%, inclusive, of silica.

The NOx adsorber catalyst can comprise a molecular sieve comprises a zeolite having an SAR from 5 to 100, inclusive, or a silica aluminophosphate comprising between 5% and 15%, inclusive, of silica.

The exchanged metal in the zeolite in the SCR catalyst can be present at a concentration of 0.01 to 10 wt. %, based on the weight of the molecular sieve.

The SCR catalyst can be present at a loading of about 0.5 to about 4.0 $g/in^3$.

The metal in the NOx adsorber catalyst can be present at a concentration of 0.01 to 20 wt. % based on the total weight of the NOx adsorber catalyst.

The NOx adsorber catalyst can be present at a loading of about 0.5 to about 4.0 g/in$^3$.

The catalyst article can comprise: (a) a first layer comprising the SCR catalyst and a second layer comprising the NOx adsorber catalyst, or (b) a first layer comprising the NOx adsorber catalyst and a second layer comprising the SCR catalyst, where the SCR catalyst comprises a zeolite having an LTA Framework Type where the zeolite has a silica-to-alumina ratio (SAR) of about 15 to about 70 and the zeolite is ion-exchanged with iron, manganese or a mixture of iron and manganese.

The first layer can be positioned to contact an exhaust gas passing through the catalyst article before contacting the second layer.

The first layer can be an overlayer located over the second layer.

The first layer can be adjacent to the second layer.

The first layer and the second layer can both be located on the same substrate.

The first layer can be positioned on a first substrate and the second layer can be positioned on a second substrate.

The molecular sieve in at least one of the first layer and the second layer can comprise an AEI, AFX, CHA or LTA structure.

The molecular sieves in the first layer and the second layer comprise an AEI, AFX, CHA or LTA structure.

The catalyst article can further comprise a flow-through substrate or a wall-flow filter having an upstream portion and a downstream portion or a filter substrate having an inlet side and an outlet side.

When the substrate is a flow-through substrate, the first layer is a coating on an upstream portion of the substrate and second layer is coated on a downstream portion of the substrate.

When the substrate is a wall-flow filter, the first layer is a coating on an inlet side of the filter and second layer is a coating on an outlet side of the filter.

The SCR catalyst can be disposed on the flow-through substrate in an upstream portion of the substrate and the NOx adsorber catalyst can be disposed on the flow-through substrate in a downstream portion of the substrate.

The SCR catalyst can be disposed on the wall-flow filter in an inlet portion of the substrate and the NOx adsorber catalyst can be disposed on the wall-flow filter in a downstream portion of the wall-flow filter.

The SCR catalyst and the NOx adsorber catalyst can be present as a mixture on the substrate.

The catalyst article can further comprise one or more additional catalyst.

The filter substrate or the flow-through substrate can comprise silicon carbide, cordierite or aluminum titanate.

The molecular sieve in the NOx adsorber catalyst can be the same as the molecular sieve in a metal-containing molecular sieve in the SCR catalyst, the metal in the NOx adsorber catalyst and the metal in the SCR catalyst are in combination with the molecular sieve.

The molecular sieve in the NOx adsorber catalyst can be different than the molecular sieve in a metal-containing molecular sieve in the SCR catalyst, the metal in the NOx adsorber catalyst can be in a first combination with the molecular sieve in the NOx adsorber catalyst, the metal in the SCR catalyst is in a second combination with the molecular sieve in the SCR catalyst and the first combination and the second combination can be present in a third combination.

The NOx adsorber catalyst can be palladium or zinc and the molecular sieve can be a small pore molecular sieve. The catalyst can further comprise one or more of Cu, Fe and Mn. Preferably the small pore molecular sieve comprises AEI, AFX, CHA or LTA.

The metal in the NOx adsorber catalyst can be palladium.

The palladium can be introduced into the molecular sieve by spray drying, impregnation, or ion exchange.

The molecular sieve can be hydrothermally aged.

The catalyst article can further comprise hydrocarbon-SCR activity.

The catalyst article can reduce stored NOx by hydrocarbon SCR.

The catalyst article can comprise a NOx adsorber catalyst comprises a palladium-containing molecular sieve and one or more of the following conditions are met:

(a) the ratio of copper to aluminum is from 0.01 to 0.5, inclusive;

(b) the ratio of palladium to aluminum is from 0.01 to 0.5, inclusive; and (c) the ratio of (copper+palladium) to aluminum is from 0.02 to 0.5, inclusive.

The catalyst article as described above for this aspect of the invention, wherein the catalyst article comprises an extruded monolith substrate, wherein:

(a) the extruded substrate comprises the SCR catalyst and the NOx adsorber catalyst is disposed on the extruded substrate as a layer; or (b) the extruded substrate comprises the NOx adsorber catalyst and the SCR catalyst is disposed on the extruded substrate as a layer; or (c) the extruded substrate comprises the SCR catalyst and the NOx adsorber catalyst.

The catalyst article can further comprise one or more additional layers, wherein the additional layers comprise one or more catalysts.

A catalytic washcoat comprising an SCR catalyst, a NOx adsorber catalyst and at least one binder, wherein the SCR catalyst comprises a metal selected from the group consisting of cerium, chromium, cobalt, copper, gallium, indium, iridium, iron, manganese, molybdenum, nickel, palladium, platinum, ruthenium, rhenium, silver, tin and zinc; the NOx adsorber catalyst comprises a molecular sieve and a metal selected from the group consisting of cerium, cobalt, iron, lanthanum, manganese, molybdenum, niobium, palladium, tungsten, silver and zinc, wherein:

(a) the metal in the SCR catalyst and the metal in the NOx adsorbed catalyst are different, or (b) the metal in the SCR catalyst and the metal in the NOx adsorbed catalyst is the same and either (i) only the NOx adsorbed catalyst comprises a molecular sieve, or (ii) the molecular sieve in the SCR catalyst is different than the molecular sieve in the NOx adsorbed catalyst, and the at least one binder is selected from the group consisting of alumina, silica, non-zeolite silica-alumina, natural clay, $TiO_2$, $ZrO_2$ and $SnO_2$.

A method for producing an ammonia slip catalyst comprising: (a) forming a bottom layer on a substrate by applying onto a substrate a bottom layer washcoat comprising a NOx adsorber catalyst comprising a metal selected from the group consisting of cerium, cobalt, iron, lanthanum, manganese, molybdenum, niobium, palladium, tungsten, silver and zinc, (b) drying the bottom layer washcoat on the substrate, (c) calcining the bottom layer washcoat on the substrate; (d) forming a top layer positioned over the bottom layer by applying a top layer washcoat comprising an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal over the calcined bottom layer formed in step (c), (e) drying the top layer washcoat on the calcined bottom layer on the substrate, and (f) calcining the top layer washcoat on the bottom layer washcoat on the substrate.

A method for producing an ammonia slip catalyst comprising: (a) forming a bottom layer on a substrate by applying onto a substrate a bottom layer washcoat comprising an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal, (b) drying the bottom layer washcoat on the substrate, (c) calcining the bottom layer washcoat on the substrate; (d) forming a top layer positioned over the bottom layer by applying a top layer washcoat comprising a NOx adsorber catalyst comprising a metal selected from the group consisting of cerium, cobalt, iron, lanthanum, manganese, molybdenum, niobium, palladium, tungsten, silver and zinc over the calcined bottom layer formed in step (c), (e) drying the top layer washcoat on the calcined bottom layer on the substrate, and (f) calcining the top layer washcoat on the bottom layer washcoat on the substrate.

An exhaust system comprising a catalyst article described above for this aspect of the invention, a passive NOx adsorber (PNA) and optionally a diesel oxidation catalyst (DOC) or catalyzed soot filter (CSF), wherein the passive NOx adsorber or the DOC follow the CSF and are positioned upstream of the catalyst article described above for this aspect of the invention and the article described above for this aspect of the invention is located on a filter.

The exhaust system can further comprise an additional SCR or an SCRF catalyst, where the additional SCR or the SCRF catalyst are positioned upstream of the catalyst article described above for this aspect of the invention.

The exhaust system can further comprise a first means to dose urea into the system upstream of the catalyst article described above for this aspect of the invention, and a second means to dose urea into the system after the catalyst article described above for this aspect of the invention.

The exhaust system can further comprise a means to control the first means to dose urea into the system before the catalyst article, wherein the means to control the first means to dose urea into the system stops or reduces the introduction of urea when the temperature of the catalyst article is below light off temperature.

An exhaust system comprising a catalyst article described above for this aspect of the invention and a close coupled catalyzed soot filter (CSF) or an SCR on filter (SCRF), where the catalyzed soot filter is positioned downstream of the catalyst article of described above for this aspect of the invention.

The exhaust system can provide at least a 50% reduction in the cumulative amount of NOx produced over the first 250 seconds in an MVEG test.

The exhaust system can provide at least a 50% reduction in the cumulative amount of NOx produced over the first 1100 seconds in an MVEG test.

The exhaust system can provide at least a 75% reduction in the cumulative amount of CO produced over the first 1200 seconds in an MVEG test.

The exhaust system can provide at least a 75% reduction in the cumulative amount of THC produced over the first 1200 seconds in an MVEG test.

The exhaust system can provide two or more of the following: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the first 1200 seconds in an MVEG test; and (d) at least a 75% reduction in the cumulative amount of THC produced over the first 1200 seconds in an MVEG test.

The exhaust system can provide three or more of the following: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the first 1200 seconds in an MVEG test; and (d) at least a 75% reduction in the cumulative amount of THC produced over the first 1200 seconds in an MVEG test.

The exhaust system can provide: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the first 1200 seconds in an MVEG test; and (d) at least a 75% reduction in the cumulative amount of THC produced over the first 1200 seconds in an MVEG test.

The exhaust system can provide at least 50%, preferably at least 60%, more preferably at least 70% NOx conversion at a temperature of less than or equal to 200° C.

The exhaust system can provide at least 90% NOx conversion at a temperature of less than or equal to 250° C.

The exhaust system can provide at least 50%, preferably at least 60%, more preferably at least 65%, most preferably at least 70% CO conversion at a temperature of 250° C.

The exhaust system can provide at least 70%, preferably at least 750%, more preferably at least 80% CO conversion at a temperature of 300° C.

The catalyst article in the exhaust system can provide NOx adsorption at 100° C.

The catalyst article can provide at least a 50% reduction in the cumulative amount of NOx produced over the first 250 seconds, preferably over the first 1100 seconds, in an MVEG test.

The catalyst article can provide at least a 75% reduction in the cumulative amount of at least one of CO and THC produced over the first 1200 seconds in an MVEG test.

The catalyst article can provide two or more of the following: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the first 1200 seconds in an MVEG test; and (d) at least a 75% reduction in the cumulative amount of THC produced over the first 1200 seconds in an MVEG test.

The catalyst article can provide three or more of the following: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the first 1200 seconds in an MVEG test; and (d) at least a 75% reduction in the cumulative amount of THC produced over the first 1200 seconds in an MVEG test.

The catalyst article can provide: (a) at least a 50% reduction in the cumulative amount of NOx produced over the first 250 seconds in an MVEG test; (b) at least a 50% reduction in the cumulative amount of NOx produced over the first 1100 seconds in an MVEG test; (c) at least a 75% reduction in the cumulative amount of CO produced over the first 1200 seconds in an MVEG test; and (d) at least a 75% reduction in the cumulative amount of THC produced over the first 1200 seconds in an MVEG test.

A method for treating an exhaust gas comprises contacting an exhaust gas stream having a concentration of NOx with a nitrogenous reductant at a temperature of about 150° C. to about 750° C. in the presence of a catalyst article comprising: (a) a wall flow monolith having an inlet face end and an outlet face and an axis of gas flow from the inlet face to the outlet face; (b) a composition comprising a first layer comprising an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal, and a second layer comprising a NOx trap catalyst comprises palladium on ceria or a metal-containing molecular sieve, where the metal is selected from the group consisting of cerium, cobalt, iron, lanthanum, manganese, molybdenum, niobium, palladium, tungsten, silver and zinc, wherein the first layer is arranged to contact an exhaust gas before the second layer and (c) optionally a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein the first composition is disposed proximal to the inlet face, and the second zone is disposed proximal to the outlet face.

The catalyst article can comprise a first layer comprising an SCR catalyst and a second layer comprising a NOx adsorber catalyst, wherein the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal, and the NOx adsorber catalyst comprises a metal-containing molecular sieve wherein the metal is selected from the group consisting of cerium, cobalt, iron, lanthanum, manganese, molybdenum, niobium, palladium, tungsten, silver and zinc, and the first layer is arranged to contact an exhaust gas before the second layer.

The catalyst article can comprise a first layer comprising an SCR catalyst and a second layer comprising a NOx adsorber catalyst, wherein the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal, and the NOx adsorber catalyst comprises a metal-containing molecular sieve wherein the metal is selected from the group consisting of cerium, cobalt, iron, lanthanum, manganese, molybdenum, niobium, palladium, tungsten, silver and zinc, and the second layer is arranged to contact an exhaust gas before the first layer.

A method for reducing the concentration of one or more of ammonia, NOx, carbon monoxide and hydrocarbons in an exhaust gas stream comprises contacting an exhaust gas stream containing ammonia, NOx, carbon monoxide and/or hydrocarbons with an ammonia slip catalyst comprising a first layer comprising an SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal, and a second layer comprising a NOx adsorber catalyst comprising a metal selected from the group consisting of cerium, cobalt, iron, lanthanum, manganese, molybdenum, niobium, palladium, tungsten, silver and zinc, wherein the first layer is arranged to contact an exhaust gas before the second layer.

A method for reducing at least one of ammonia, NOx, CO and hydrocarbons in an exhaust gas comprises contacting the gas with a catalyst article comprising: (a) a wall flow monolith having an inlet face end and an outlet face and an axis of gas flow from the inlet face to the outlet face; (b) a first layer comprising a first SCR catalyst and a second layer comprising a NOx adsorber catalyst comprising a metal selected from the group consisting of cerium, cobalt, iron, lanthanum, manganese, molybdenum, niobium, palladium, tungsten, silver and zinc, wherein the first layer is arranged to contact an exhaust gas before the second layer and optionally, (c) a second composition comprising a first layer comprising a second SCR catalyst and a second layer comprising a precious group metal, wherein at least one of the first SCR catalyst and the second SCR catalyst is a zeolite having an LTA Framework Type where the zeolite has a silica-to-alumina ratio (SAR) of about 15 to about 70 and the zeolite comprises iron, manganese or a mixture of iron and manganese as an extra-framework metal, wherein the first layer is arranged to contact an exhaust gas before the second layer; wherein the first and second compositions are disposed within a portion of the wall flow monolith and in series along the axis, and herein the first composition is disposed proximal to the inlet face, and the second zone is disposed proximal to the outlet face for a time and temperature sufficient to reduce the level of at least one of ammonia, NOx, CO and hydrocarbons in the gas.

A method for reducing or oxidizing at least one of ammonia, NOx, CO and hydrocarbons in an exhaust gas comprises contacting the gas with a catalyst article comprising: (a) a wall flow monolith having an inlet face end and an outlet face and an axis of gas flow from the inlet face to the outlet face; (b) a first layer comprising a first SCR catalyst and a second layer comprising a NOx adsorber catalyst comprising a metal selected from the group consisting of cerium, cobalt, iron, lanthanum, manganese, molybdenum, niobium, palladium, tungsten, silver and zinc, wherein the second layer is arranged to contact an exhaust gas before the first layer and optionally, (c) a second composition comprising a first layer comprising a second SCR catalyst and a second layer comprising a precious group metal, wherein at least one of the first SCR catalyst and the second SCR catalyst is a zeolite having an LTA Framework Type where the zeolite has a silica-to-alumina ratio (SAR) of about 15 to about 70 and the zeolite comprises iron, manganese or a mixture of iron and manganese as an extra-framework metal, wherein the first layer is arranged to contact an exhaust gas before the second layer; wherein the first and second compositions are disposed within a portion of the wall or on wall of a wall flow monolith and in series along the axis, and wherein the first composition is disposed proximal to the inlet face, and the second zone is disposed proximal to the outlet face for a time and temperature sufficient to reduce the level of at least one of ammonia, NOx, CO and hydrocarbons in the gas.

A method for reducing the concentration of at least one of ammonia, NOx, CO and THC in an exhaust gas stream, the method comprising contacting an exhaust gas stream containing ammonia, NOx, CO and THC with a catalyst article described above for this aspect of the invention for a time and temperature sufficient to reduce the level of at least one of ammonia, NOx, CO and THC in the gas.

A method for reducing the concentration of NOx in an exhaust gas stream during the cold start of the engine comprises contacting an exhaust gas stream containing NOx with a catalyst article described above for this aspect of the invention, wherein stored NOx is reduced by hydrocarbon SCR.

An ammonia slip catalyst can comprise an inlet zone and an outlet zone, wherein an SCR catalyst is positioned within the inlet zone and a NOx adsorber catalyst is positioned within the outlet zone, wherein the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal, the NOx adsorber catalyst comprises a metal-containing molecular sieve wherein the metal is selected from the group consisting of cerium, cobalt, iron, lanthanum, manganese, molybdenum, niobium, palladium, tungsten, silver and zinc, and wherein at least one of the SCR catalyst and the NOx adsorber catalyst are positioned on a wall-flow filter.

A catalyst article can comprise an SCR catalyst and a NOx adsorber catalyst, wherein the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal, and the NOx adsorber catalyst comprises & metal-containing molecular sieve, wherein the metal palladium, silver, or mixtures thereof, wherein the SCR catalyst and the NOx adsorber catalyst comprise the same molecular sieve and both the metal of the SCR catalyst and the metal of NOx adsorber catalyst are exchanged in the molecular sieve.

The molecular sieve in the metal-containing molecular sieve in the NOx adsorber catalyst can comprise a zeolite, an aluminophosphate, or a silicoaluminophosphate.

The molecular sieve in the metal-containing molecular sieve in the NOx adsorber catalyst can be a small pore molecular sieve.

The small pore molecular sieve can comprise a Framework Type selected from the group consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SIV, THO, TSC, UEI, UFI, VNI, YUG, and ZON, and mixtures or intergrowths thereof, preferably the molecular sieve comprises an AEI or CHA Framework Type.

The ratio of the weight of exchanged metal in the SCR catalyst to the weight of exchanged metal in the NOx adsorber catalyst can be from 0.1 to 70.

A method of preparing a catalyst article described above for this aspect of the invention comprises:

(a) adding a first metal selected from the group consisting of iron, manganese, and mixtures thereof, to a zeolite having an LTA Framework Type where the zeolite has a silica-to-alumina ratio (SAR) of about 15 to about 70 to form a molecular sieve containing the first metal;

(b) calcining the molecular sieve containing the first metal to form a first calcined molecular sieve;

(c) adding a second metal selected from the group selected from the group consisting of palladium or silver, and mixtures thereof, to the first calcined molecular sieve to form a molecular sieve containing the first metal and the second metal; and (d) calcining the molecular sieve containing the first metal and the second metal.

Steps (a) and (c) can comprise adding the first and second metal by one or more of impregnation, adsorption, ion-exchange, incipient wetness, precipitation, or the like.

The method can further comprise steps (a1) and (c1), wherein step (a1) comprises drying the molecular sieve containing the first metal and step (c1) comprises drying the molecular sieve containing the first metal and the second metal.

A method for reducing the concentration of NOx in an exhaust gas stream during the cold start of the engine comprises contacting an exhaust gas stream containing NOx with a catalyst article described above for this aspect of the invention, storing NOx in the catalyst article during cold engine startup, and reducing stored NOx by hydrocarbon SCR.

In the 14th aspect of the invention, a catalyst article comprises a substrate comprising an inlet and an outlet, a first zone comprising a first SCR catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal, and a second zone comprising an oxidation catalyst, where the first zone is located on the inlet side of the substrate, and the second zone is located on the outlet side of the substrate.

The first zone can provide a very fast response to urea or ammonia.

The first zone can have very low $NH_3$ storage.

The substrate can comprise a first substrate and a second substrate, each substrate comprises an inlet end and an outlet end, and at least a portion of the first zone is located on the first substrate and a portion of the second zone is located on the second substrate, where the first zone is located on the inlet side of the first substrate and the second zone is located on the outlet side of the second substrate.

The substrate can comprise a first substrate and a second substrate where the first zone is located on the first substrate and the second zone is located on the second substrate.

The catalyst article can further comprise a third zone comprising an ammonia slip catalyst (ASC) comprising (a) a first SCR catalyst or a second SCR catalyst and (b) an ammonia oxidation catalyst, where the third zone is located between the first zone and the second zone, wherein at least one of the first SCR catalyst and the second SCR catalyst is a zeolite having an LTA Framework Type where the zeolite has a silica-to-alumina ratio (SAR) of about 15 to about 70 and the zeolite is ion-exchanged with iron, manganese or a mixture of iron and manganese.

The ammonia slip catalyst can be a single layer comprising a mixture of: (a) a first SCR catalyst or a second SCR catalyst and (b) an ammonia oxidation catalyst.

The ammonia slip catalyst can be a bi-layer comprising a bottom layer comprising an ammonia oxidation catalyst and a top layer comprising a first SCR catalyst or a second SCR catalyst.

The catalyst article can have the substrate comprise a first substrate and a second substrate, where each substrate comprises an inlet end and an outlet end, and the first zone and the third zone are located on the first substrate, where the first zone is located on the inlet side of the first substrate and the third zone is located on the outlet side of the first substrate, and the second zone is located on the second substrate.

The catalyst article can have the substrate comprise a first substrate and a second substrate, where each substrate comprises an inlet end and an outlet end, and the first zone is located on the first substrate, and the second zone and third zone are located on the second substrate, where the third zone is located on the inlet side of the second substrate and the second zone is located on the outlet side of the second substrate.

The catalyst article can have the substrate comprise a first substrate, a second substrate and a third substrate, where the first zone is located on the first substrate, the third zone is located on the second substrate, and the second zone is located on the third substrate, where the third zone is located downstream of the first zone and the second zone is located downstream of the third zone.

The catalyst article can have the second SCR catalyst comprise an active component selected from the group consisting of a base metal, an oxide of a base metal, a molecular sieve, a metal exchanged molecular sieve and mixtures thereof.

The base metal can be selected from the group consisting of cerium (Ce), chromium (Cr), cobalt (Co), copper (Cu), iron (Fe), manganese (Mn), molybdenum (Mo), nickel (Ni), tungsten (W), vanadium (V) and zirconium (Zr), and mixtures thereof.

The catalyst article can further comprise at least one base metal promoter.

The molecular sieve or the metal exchanged molecular sieve can be small pore, medium pore, large pore or a mixture thereof.

The molecular sieve can be selected from the group consisting of zeolite molecular sieves, metal-substituted zeolite molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeSAPO) molecular sieves, and mixtures thereof.

The molecular sieve can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, EM, GIS, GOO, IHW, ITE, ITW, KFI, LEV, LTA, MER, MON, NSI, OWE, PAU, PHI, RHO, RTH, SAT, SAV, SIV, THO, TSC, UEI, UFI, VNI, YUG, and ZON, and mixtures and/or intergrowths thereof.

The molecular sieve can comprise a small pore molecular sieve selected from the group of Framework Types consisting of AEI, AFX, CHA, DDR, ERI, ITE, KFI, LEV, LTA and SFW.

The molecular sieve can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, and WEN, and mixtures and/or intergrowths thereof, preferably FRE, MFI and STT.

The molecular sieve can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof.

The DOC catalyst can comprise a platinum group metal or mixtures thereof, preferably platinum, palladium or a combination of platinum and palladium.

The DOC catalyst can be present in a loading of about 5 to about 75 $g/ft^3$, preferably about 8 $g/ft^3$ to about 50 $g/ft^3$.

The DOC catalyst can comprise platinum and palladium, where Pt and Pd are present in a ratio of from 10:1 to 1:100 by weight, preferably from 5:1 to 1:10 by weight.

The ammonia oxidation catalyst can comprise a platinum group metal, preferably platinum, palladium, ruthenium, or a mixture there of.

The platinum group metal loading in the ammonia oxidation catalyst can range from 0.1 $g/ft^3$ to 20 $g/ft^3$, preferably from 1 $g/ft^3$ to 10 $g/ft^3$.

When the catalyst article comprises an ammonia slip catalyst as a single layer comprising a mixture of: (a) a first SCR catalyst or a second SCR catalyst and (b) an ammonia oxidation catalyst, the mixture can further comprise Pd, Nb—Ce—Zr or Nb on $MnO_2$.

The ammonia oxidation catalyst can comprise platinum on a support with low ammonia storage.

The support with low ammonia storage can be a siliceous support.

The siliceous support can comprise a silica or a zeolite with a silica-to-alumina ratio of at least one of: (a) at least 100, (b) at least 200, (c) at least 250, (d) at least 300, (e) at least 400, (f) at least 500, (g) at least 750 and (h) at least 1000.

The siliceous support can comprise a molecular sieve having a BEA, CDO, CON, FAU, GME, MEL, MFI or MWW Framework Type.

The ratio of the amount of the SCR catalyst to the amount of platinum on the support with low ammonia storage is in the range of at least one of: (a) 0:1 to 300:1, (b) 3:1 to 300:1, (c) 7:1 to 100:1 and (d) 10:1 to 50:1, including each of the end-points in the ratio, based on the weight of these components.

The substrate can be cordierite, a high porosity cordierite, a metallic substrate, an extruded SCR, a wall flow filter, a filter or an SCRF.

The article can comprise a first piece and a second piece, where the first piece comprises the first zone and the second zone and the second piece comprises the third zone.

The article can comprise a first piece and a second piece, where the first piece comprises the first zone and the second piece comprises the second zone and the third zone.

The article can comprise a first piece, a second piece and a third piece, where the first piece comprises the first zone, the second piece comprises the third zone and the third piece comprises the second zone.

An exhaust system comprising a catalyst article described above for this aspect of the invention and a first means for introducing $NH_3$ into the exhaust gas or forming $NH_3$ in the exhaust gas, where the first means for introducing $NH_3$ or forming $NH_3$ in the exhaust gas is located before the catalytic article.

The exhaust system can further comprise a CSF or an SCRF, where the CSF or SCRF are positioned downstream of the catalytic article and, when the system comprises an SCRF, a second means for introducing $NH_3$ into the exhaust gas or forming NH$_3$ in the exhaust gas is located between the catalytic article and the SCRF.

An engine comprising an exhaust system comprising a catalyst article described above for this aspect of the invention and a means for introducing NH$_3$ into the exhaust gas, or forming NH$_3$ in the exhaust gas.

A method of reducing N$_2$O formation from NH$_3$ in an exhaust gas, the method comprising contacting an exhaust gas comprising ammonia with a catalyst article described above for this aspect of the invention.

A method of reducing NOx formation in an exhaust gas, the method comprising contacting an exhaust gas comprising ammonia with a catalyst article described above for this aspect of the invention.

A method of reducing hydrocarbon formation in an exhaust gas, the method comprising contacting an exhaust gas comprising hydrocarbons with a catalyst article described above for this aspect of the invention.

In the 15th aspect of the invention, a catalyst article comprises a substrate comprising an inlet end and an outlet end, a first zone and a second zone, where the first zone comprises an ammonia slip catalyst (ASC) comprising a platinum group metal and a first SCR catalyst comprising a metal exchange molecular sieve, vanadium or a base metal, and the second zone comprises a second catalyst selected from the group consisting of a diesel oxidation catalyst (DOC), a diesel exotherm catalyst (DEC), a catalyzed soot filter (CSF), a NOx absorber, a selective catalytic reduction/passive NOx adsorber (SCR/PNA), a cold-start catalyst (CSC) or a three-way catalyst (TWC), where the first zone is located upstream of the gas flow relative to the second zone, wherein at least one of the SCR catalyst and the SCR/PNA comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

The iron, manganese or a mixture of iron and manganese as the extra-framework metal on the zeolite can be present in a total amount of from 0.5 to 10% of the weight of the zeolite.

The first zone and the second zone can be located on the same substrate where the first zone can be located on the inlet side of the substrate and the second zone can be located on the outlet side of the substrate.

The catalyst article can further comprise a second substrate, where the first zone is located on a first substrate and the second zone is located on the second substrate and the first substrate is located upstream of the second substrate.

The ammonia slip catalyst can comprise a bottom layer comprising a platinum group metal and a top layer comprising the first SCR catalyst located over the bottom layer.

The ammonia slip catalyst can comprise a blend of a platinum group metal on a support with low ammonia storage and a first SCR catalyst.

The second zone can comprise a blend of an oxidation catalyst and a second SCR catalyst.

The catalytic article can comprise a second SCR catalyst, where the second SCR catalyst is located between the ammonia oxidation catalyst and the second catalyst (i.e. downstream of an ASC and upstream of a diesel oxidation catalyst (DOC), a diesel exotherm catalyst (DEC), a catalyzed soot filter (CSF), a NOx absorber, a selective catalytic reduction/passive NOx adsorber (SCR/PNA), a cold-start catalyst (CSC) or a three-way catalyst (TWC).)

The platinum group metal can comprise platinum, palladium or a combination of platinum and palladium.

The platinum group metal can be on a support with low ammonia storage.

Platinum can be present from at least one of: (a) 0.01-0.3 wt. %, (b) 0.03-0.2 wt. %, (c) 0.05-0.17 wt. %, and (d) 0.07-0.15 wt. %, inclusive, relative to the weight of the support of platinum+the weight of platinum+the weight of the first SCR catalyst in the blend.

The second SCR catalyst can be a base metal, an oxide of a base metal, a molecular sieve, a metal exchanged molecular sieve or a mixture thereof.

The molecular sieve or the metal exchanged molecular sieve is small pore, medium pore, large pore or a mixture thereof.

The catalyst article can comprise only one ammonia slip catalyst (ASC) and either (a) the second zone does not comprise a diesel oxidation catalyst (DOC) or (b) the DOC is not located adjacent to, and downstream of, the ammonia slip catalyst.

The catalyst article can further comprise a third zone comprising an ASC catalyst, where the third zone is located between the first zone and the second zone.

The PGM in the first zone can comprise palladium in an amount sufficient to generate an exotherm.

In the 16th aspect of the invention, a catalyst article comprises a substrate comprising an inlet end and an outlet end, a first zone comprising a first SCR catalyst and a second zone comprising an ammonia slip catalyst (ASC), where the ammonia slip catalyst comprises a second SCR catalyst and an oxidation catalyst, and the ASC has DOC functionality, where the first zone is located on the inlet side of the substrate and the second zone is located in the outlet side of the substrate and at least one of the first and second SCR catalysts comprises a zeolite having an LTA Framework Type where the zeolite has a silica-to-alumina ratio (SAR) of about 15 to about 70 and the zeolite comprises iron, manganese or a mixture of iron and manganese as an extra-framework metal, or a zeolite having an SFW Framework Type, The first zone and the second zone can be located on the same substrate and the first zone can be located on the inlet side of the substrate and the second zone can be located on the outlet side of the substrate.

The catalyst article can further comprise a second substrate, where the first zone is located on a first substrate and the second zone is located on the second substrate and the first substrate is located upstream of the second substrate. The catalyst article can comprise a first piece and a second piece, where the first zone is located in the first piece and the second zone is located in the second piece and the first piece is located upstream of the second piece.

The ASC can be a bi-layer with a bottom layer comprising an oxidation catalyst and a top, overlayer, comprising a second SCR catalyst.

The catalyst article can have a second zone comprising a blend of the oxidation catalyst and the second SCR catalyst.

The oxidation catalyst can comprise a platinum group metal.

The oxidation catalyst can comprise platinum or palladium or mixtures thereof. Pt can be present in an amount from about 0.1 g/ft$^3$ to about 20 g/ft$^3$ in the ASC zone. Pd can be present in an amount from about 0.1 g/ft$^3$ to about 20 g/ft$^3$ in the ASC zone. Pt and Pd can present in a ratio of from about 1:0.01 to about 1:10 by weight.

The first SCR catalyst can be a base metal, an oxide of a base metal, a molecular sieve, a metal exchanged molecular sieve or a mixture thereof. The base metal can be selected from the group consisting of vanadium (V), molybdenum (Mo) and tungsten (W), chromium (Cr), cerium (Ce), manganese (Mn), iron (Fe), cobalt (Co), nickel (Ni), copper (Cu) and zirconium (Zr), and mixtures thereof. The catalyst article can further comprise at least one base metal promoter. The molecular sieve or the metal exchanged molecular sieve can be a small pore, medium pore, large pore or a mixture thereof.

The first SCR catalyst can comprise a small pore molecular sieve selected from the group consisting of zeolite molecular sieves, metal-substituted zeolite molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeSAPO) molecular sieves, and mixtures thereof.

The first SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, EM, GIS, GOO, IHW, ITE, ITW, KFI, LTA, LEV, MER, MON, NSI, OWE, PAU, PHI, RHO, RTH, SAT, SAV, SIV, THO, TSC, UEI, UFI, VNI, YUG, and ZON, and mixtures and/or intergrowths thereof, preferably AEI, AFX, CHA, DDR, EM, KFI, ITE, LEV, LTA or SFW.

The first SCR catalyst can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, and WEN, and mixtures and/or intergrowths thereof.

The first SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof.

The second SCR catalyst can be a Cu-SCR catalyst, an Fe-SCR catalyst, a base metal, an oxide of a base metal or a mixed oxide or a vanadium catalyst.

The Cu-SCR catalyst comprises copper and a molecular sieve, the Fe-SCR catalyst comprises iron and a molecular sieve.

The molecular sieve can be a zeolite, an aluminophosphate (AlPO), a silico-aluminophosphate (SAPO), or mixtures thereof.

The Cu-SCR or Fe-SCR can comprise a molecular sieve comprising a framework type selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, KFI, LEV, LTA, MER, MON, NSI, OWE, PAU, PHI, RHO, RTH, SAT, SAV, SIV, THO, TSC, UEI, UFI, VNI, YUG, and ZON, and mixtures and/or intergrowths thereof, preferably AEI, AFX, CHA, DDR, EM, ITE, KFI, LEV, LTA or SFW.

The oxidation catalyst can comprise platinum on a support with low ammonia storage.

When the catalyst article comprises an ammonia slip catalyst as a single layer comprising a mixture of: (a) a first SCR catalyst or a second SCR catalyst and (b) an ammonia oxidation catalyst, the mixture can further comprise Pd, Nb—Ce—Zr or Nb on $MnO_2$.

The support with low ammonia storage can be a siliceous support. The siliceous support can comprise a silica or a zeolite with a silica-to-alumina ratio of at least one of: (a) at least 100, (b) at least 200, (c) at least 250, (d) at least 300, (e) at least 400, (f) at least 500, (g) at least 750 and (h) at least 1000. The siliceous support can comprise BEA, CDO, CON, FAU, GME, MEL, MFI or MWW.

The ratio of the amount of the second SCR catalyst to the amount of platinum on the support with low ammonia storage can be in the range of at least one of: (a) 0:1 to 300:1, (b) 3:1 to 300:1, (c) 7:1 to 100:1 and (d) 10:1 to 50:1, including each of the end-points in the ratio, based on the weight of these components.

Platinum can be present from at least one of: (a) 0.01-0.3 wt. %, (b) 0.03-0.2 wt. %, (c) 0.05-0.17 wt. %, and (d) 0.07-0.15 wt. %, inclusive, relative to the weight of the support of platinum+the weight of platinum+the weight of the first SCR catalyst in the blend.

The substrate can be cordierite, a high porosity cordierite, a metallic substrate, an extruded SCR, a wall flow filter, a filter or an SCRF.

The top layer can further comprise palladium.

The catalyst article can provide an improvement in $N_2$ yield from ammonia at a temperature from about 250° C. to about 350° C. compared to a catalyst comprising a comparable formulation in which the first SCR catalyst is present as a first coating and the platinum on a support with low ammonia storage is present in a second coating and gas comprising $NH_3$ passes through the first coating before passing through the second coating.

The catalyst article can provide at least one of: (a) an improvement in $N_2$ yield from ammonia at a temperature from about 350° C. to about 450° C., and (b) a reduction in NOx formation at a temperature from about 350° C. to about 450° C., compared to a catalyst comprising a comparable formulation in which the first SCR catalyst is present as a first coating and the supported platinum is present in a second coating and gas comprising $NH_3$ passes through the first coating before passing through the second coating.

The catalyst article can provide reduced $N_2O$ formation from $NH_3$ compared to a catalyst comprising a comparable formulation in which the first SCR catalyst is present as a first coating and the supported platinum is present in a second coating and gas comprising $NH_3$ passes through the first coating before passing through the second coating.

The catalyst article can generate an exotherm.

An exhaust system can comprise a catalyst article described above for this aspect of the invention and a first means for forming $NH_3$ in the exhaust gas or introducing $NH_3$ into the exhaust gas, where the first means for forming $NH_3$ in the exhaust gas or introducing $NH_3$ into the exhaust gas is located before the catalytic article.

The exhaust system can further comprise a CSF or an SCRF, where the CSF or SCRF are positioned downstream of the catalytic article and, when the system comprises an SCRF, a second means for forming $NH_3$ in the exhaust gas or introducing $NH_3$ into the exhaust gas is located between the catalytic article and the SCRF. The CSF can comprise a high PGM loading in the front of the CSF.

An engine can comprise an exhaust system comprising a catalyst article described above for this aspect of the invention and a means for forming $NH_3$ in the exhaust gas or introducing $NH_3$ into the exhaust gas.

A method of controlling hydrocarbon emissions in an exhaust gas can comprise contacting an exhaust gas comprising hydrocarbons with a catalyst article described above for this aspect of the invention.

A method of forming an exotherm in a catalyst treating hydrocarbon emissions in an exhaust gas can comprise contacting an exhaust gas comprising hydrocarbons with a catalyst article described above for this aspect of the invention.

A method of controlling NOx emissions in an exhaust gas can comprise contacting an exhaust gas comprising NOx or $NH_3$ with a catalyst article described above for this aspect of the invention.

A method of controlling $N_2O$ emissions in an exhaust gas can comprise contacting an exhaust gas comprising NOx or $NH_3$ with a catalyst article described above for this aspect of the invention.

The catalyst article described above for this aspect of the invention cannot be part of an exhaust system comprising a DOC.

In the 17th aspect of the invention, a catalytic article comprises a flow-through substrate having an inlet, an outlet, and an axial length; an SCR zone comprising a first SCR catalyst; and an oxidation zone comprising: (a) an ASC zone and a DOC zone or (b) a mixed ASC and DOC zone, where the oxidation zone comprises an ammonia oxidation catalyst and a DOC catalyst, the SCR zone is positioned on the substrate from the inlet end and extends less than the axial length of the substrate from the inlet, the DOC zone or the mixed ASC and DOC zone is position on the substrate from the outlet end, and when the DOC zone is present, the ASC zone is located between the SCR zone and the DOC zone, wherein the first SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

The iron, manganese or a mixture of iron and manganese can be present in a total amount of from 0.5 to 10% of the weight of the zeolite.

The first SCR catalyst can overlap a portion of the ASC zone or a mixed ASC/DOC zone.

The catalytic article can be configured so that: (a) the ASC zone comprises a bottom layer comprising an ammonia oxidation catalyst and a top layer comprising the first SCR catalyst, where the first SCR catalyst covers the entire portion of the ammonia oxidation catalyst in the ASC zone, and (b) the DOC zone comprises a bottom layer comprising an ammonia oxidation catalyst and a top layer comprising the DOC catalyst, where the DOC catalyst covers the entire portion of the ammonia oxidation catalyst in the DOC zone.

The catalytic article can be configured so that the ASC zone can comprise a bottom layer comprising a mixture of an ammonia oxidation catalyst and a DOC, and a portion of the first SCR also forms a top layer that covers the entire portion of the mixture of the ammonia oxidation catalyst and the DOC in the ASC zone, and the DOC zone comprises a mixture of an ammonia oxidation catalyst and a DOC, where the mixture is located on the substrate in the ASC zone and the DOC zone.

The catalytic article can be configured so that the ASC zone can comprise a bottom layer comprising a mixture of an ammonia oxidation catalyst and a DOC, where the bottom layer is located on the substrate, and a portion of the first SCR forms a top layer that covers the entire portion of the bottom layer in the ASC zone, and the DOC zone comprises a mixture of an ammonia oxidation catalyst and a DEC, where the mixture of an ammonia oxidation catalyst and a DOC in the DOC zone is located on the substrate.

The catalytic article can be configured so that the oxidation zone can comprise a mixed ASC/DOC zone comprising a bottom layer comprising a mixture of an ammonia oxidation catalyst and a DOC, and a top layer comprising the first SCR, where the top layer covers the entire bottom layer, and the bottom layer is located on the substrate.

The catalytic article can further comprise a second SCR catalyst, where the second SCR catalyst covers a portion of the first SCR catalyst and the second SCR catalyst is the same as, or different than, the first SCR catalyst.

The catalytic article can further comprise a second SCR catalyst, where the first SCR catalyst covers a portion of the second SCR catalyst and the second SCR catalyst is the same as, or different than, the first SCR catalyst.

The second SCR catalyst can comprise a different active catalyst than the first SCR catalyst.

The second SCR catalyst can have a different loading than the first SCR catalyst.

The ASC zone can comprise the first SCR catalyst, the second SCR catalyst and an ammonia oxidation catalyst.

The ASC zone can comprise a bottom layer comprising an ammonia oxidation catalyst, a middle layer comprising the first SCR catalyst, and a third layer comprising the second SCR catalyst The thickness of the middle layer can decrease from the inlet side of the ASC zone to the outlet side of the ASC zone and the thickness of the second SCR catalyst can increase from the inlet side of the ASC zone to the outlet side of the ASC zone, and the DOC zone can comprise a bottom layer comprising an ammonia oxidation catalyst, a middle layer comprising a DOC and a top layer comprising the second SCR, where the bottom layer in the ASC zone and the DOC zone is located on the substrate, and the DOC is located only in the DOC zone.

The ASC zone can comprise a bottom layer comprising a mixture of an ammonia oxidation catalyst and a DOC, a middle layer comprising the first oxidation catalyst, and a third layer comprising the second SCR catalyst.

The thickness of the middle layer can decrease from the inlet side of the ASC zone to the outlet side of the ASC zone and the thickness of the second SCR catalyst can increase from the inlet side of the ASC zone to the outlet side of the ASC zone, and the DOC zone can comprise a bottom layer comprising a mixture of an ammonia oxidation catalyst and a DOC and a top layer comprising the second SCR, where the bottom layer in the ASC zone and the DOC zone is located on the substrate.

The catalytic article can be configured so that the SCR zone comprises the first SCR catalyst and the second SCR catalyst and the second SCR catalyst overlaps a portion of the first SCR catalyst in the SCR zone, and the mixed ASC/DOC zone comprises a bottom layer comprising a mixture of an ammonia oxidation catalyst and a DOC, where the bottom layer is located on the substrate, and a top layer comprising the second SCR that covers the entire portion of the bottom layer in the mixed ASC/DOC zone.

The second SCR catalyst, when present, can comprise an active component independently selected from the group consisting of a base metal, an oxide of a base metal, a molecular sieve, a metal exchanged molecular sieve or a mixture thereof.

The base metal can be selected from the group consisting of vanadium (V), molybdenum (Mo), tungsten (W), chromium (Cr), cerium (Ce), manganese (Mn), iron (Fe), cobalt (Co), nickel (Ni), and copper (Cu), and mixtures thereof.

The catalytic article can further comprise at least one base metal promoter.

The molecular sieve or the metal exchanged molecular sieve can be small pore, medium pore, large pore or a mixture thereof.

The second SCR catalyst can comprise a small pore molecular sieve selected from the group consisting of zeolite molecular sieves, metal-substituted zeolite molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

The second SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, EM, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof, preferably AEI, AFX, CHA, DDR, EM, ITE, KFI, LEV, LTA or SFW.

The second SCR catalyst can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, and WEN, and mixtures and/or intergrowths thereof.

The second SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof.

The catalytic article described above for this aspect of the invention can have the first SCR layer cover about 50 to about 90%, preferably about 60 to about 80%, more preferably about 70 to about 80%, of the axial length of the substrate.

The ASC can comprise a bi-layer with a lower layer comprising an ammonia oxidation catalyst and an upper layer, comprising an SCR catalyst.

The ammonia oxidation catalyst can comprise a platinum group metal, preferably platinum, palladium or a combination there of.

The platinum group metal loading in the ammonia oxidation catalyst can range from 0.5 g/ft$^3$ to 50 g/ft$^3$.

The ammonia oxidation catalyst or the mixture of the ammonia oxidation catalyst and a DOC can cover about 10% to about 50% of the length of the support.

The ammonia oxidation catalyst or the mixture of the ammonia oxidation catalyst and a DOC can cover about 10% to about 40%, inclusive, of the length of the support.

The oxidation zone can cover about 10% to about 40% of the length of the support, preferably about 15% to about 30% of the length of the support.

The DOC catalyst can comprise a noble metal, a base metals or a zeolite.

The DOC catalyst can be present in a loading of about 5 to about 75 g/ft$^3$, preferably about 10 g/ft$^3$ to about 40 g/ft$^3$.

The catalytic article described above for this aspect of the invention can have the DOC comprise platinum or palladium.

The catalytic article described above for this aspect of the invention can have the DOC comprises platinum and palladium where the weight ratio of Pt:Pd is from 1:0 to 0:1, endpoints not included.

The DOC can cover between about 10% to about 30% of the length of the support, preferably about 10% to about 25% of the length of the support.

The catalyst can provide NH$_3$ slip control selectivity by converting about 90% of the NOx generated in NH$_3$ oxidation by the ASC and DOC zones to nitrogen and water.

The catalytic article described above for this aspect of the invention can have the DOC as a DEC where the DEC catalyst generates an exotherm and generates NO$_2$ for passive regeneration of a downstream filter.

The DEC catalyst can comprise a noble metal, a base metals or a zeolite.

The DEC catalyst can be present in a loading of about 5 g/ft$^3$ to about 75 g/ft$^3$, preferably about 10 g/ft$^3$ to about 40 g/ft$^3$.

The DEC can comprise platinum, palladium or a combination of platinum and palladium.

The DEC can comprise platinum and palladium, where the weight ratio of Pt:Pd is from 1:0 to 0:1, endpoints not included.

The substrate can be cordierite, a high porosity cordierite, a metallic substrate, an extruded SCR, a filter, an SCRF or an extruded catalyst.

The substrate can be an inert substrate.

An exhaust system comprising a catalytic article described above for this aspect of the invention and a means for forming NH$_3$ in the exhaust gas or introducing NH$_3$ into the exhaust gas.

The catalytic article can be close coupled to an engine.

A method of providing low temperature NOx control coupled with good ASC selectivity and DOC capability in the exhaust from a diesel engine, the method comprising contacting an exhaust gas from the engine with a catalyst article described above for this aspect of the invention.

In the 18th aspect of the invention, a catalyst article comprises: (a) an extruded support having an inlet, an outlet and a plurality of channels through which exhaust gas flows during operation of an engine, and (b) a single layer coating or a bi-layer coating on the support, where the single layer coating comprises a blend of platinum on a support with low ammonia storage with a first SCR catalyst, and the bi-layer coating comprises a bottom layer and a top layer, where the bottom layer is located between the top layer and the extruded support, the bottom layer comprises a blend of platinum on a support with low ammonia storage with a first SCR catalyst, the top layer comprises a second SCR catalyst, and the extruded support comprises a third SCR catalyst, where at least one of the first SCR, the second SCR catalyst and the third SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

Iron, manganese or a mixture of iron and manganese can be present in a total amount of from 0.5 to 10% of the weight of the zeolite.

The support with low ammonia storage can be a siliceous support.

The ratio of the amount of the first SCR catalyst to the amount of platinum on the support with low ammonia storage is in the range of at least one of: (a) 0:1 to 300:1, (b) 3:1 to 300:1, (c) 7:1 to 100:1; and (d) 10:1 to 50:1, inclusive, based on the weight of these components.

The first SCR catalyst can be a Cu-SCR catalyst comprising copper and a small pore molecular sieve, an Fe-SCR catalyst comprising iron and a small pore molecular sieve, or a mixed oxide.

The second SCR catalyst and the third SCR catalyst can be, independent of each other, a base metal, an oxide of a base metal, a molecular sieve, a metal exchanged molecular sieve or a mixture thereof.

The molecular sieve or the metal exchanged molecular sieve can be small pore, medium pore, large pore or a mixture thereof.

The catalyst can provide an improvement in $N_2$ yield from ammonia at a temperature from about 250° C. to about 300° C. compared to a catalyst comprising a comparable formulation in which the first SCR catalyst is present as a first layer and the platinum on a siliceous support is present in a second layer and gas comprising $NH_3$ passes through the first layer before passing through the second layer.

When the first SCR catalyst comprises vanadium, the catalyst article can provide reduced deactivation compared to a catalyst comprising a comparable formulation in which the first SCR catalyst is present as a first layer and the platinum on a siliceous support is present in a second layer and gas comprising $NH_3$ passes through the first layer before passing through the second layer.

An exhaust system can comprise a catalyst article described above for this aspect of the invention and a means for forming $NH_3$ in the exhaust gas.

An exhaust system can comprise the catalyst article described above for this aspect of the invention, an SCR catalyst and DOC catalyst, where the SCR catalyst is located between the catalyst article described above for this aspect of the invention and the DOC catalyst.

The exhaust system can comprise a platinum group metal before an SCR catalyst where the amount of the platinum group metal is sufficient to generate an exotherm.

A method of improving the $N_2$ yield from ammonia in an exhaust gas at a temperature from about 250° C. to about 300° C. comprises contacting an exhaust gas comprising ammonia with a catalyst article described above for this aspect of the invention.

This method can provide an improvement in yield of about 10% to about 20% compared to a catalyst comprising a comparable formulation in which the first SCR catalyst is present as a first layer and the platinum on a siliceous support is present in a second layer and gas comprising $NH_3$ passes through the first layer before passing through the second layer.

A method of reducing $N_2O$ formation from $NH_3$ in an exhaust gas can comprise contacting an exhaust gas comprising ammonia with a catalyst article described above for this aspect of the invention.

The reduction in $N_2O$ formation can be about 20% to about 40% compared to a catalyst comprising a comparable formulation in which the first SCR catalyst is present as a first layer and the platinum on a siliceous support is present in a second layer and gas comprising $NH_3$ passes through the first layer before passing through the second layer.

In the 19th aspect of the invention, a catalytic article comprises a substrate having an inlet and outlet and coated with a first coating comprising a blend of platinum on a support with low ammonia storage with a first SCR catalyst; a second coating comprising a second SCR catalyst; wherein the second coating at least partially overlaps the first coating, and wherein at least one of the first and second SCR catalyst comprises a zeolite having an LTA Framework Type where the zeolite has a silica-to-alumina ratio (SAR) of about 15 to about 70 and the zeolite is ion-exchanged with iron, manganese or a mixture of iron and manganese.

The first SCR catalyst can comprise Cu or Fe loaded on a molecular sieve selected from the group of Framework Types consisting of ACO, AEI, AEN, AFN, AFT, AFX, ANA, APC, APD, ATT, CDO, CHA, DDR, DFT, EAB, EDI, EPI, EM, GIS, GOO, IHW, ITE, ITW, KFI, LEV, LTA, MER, MON, NSI, OWE, PAU, PHI, RHO, RTH, SAT, SAV, SIV, THO, TSC, UEI, UFI, VNI, YUG, ZON, BEA, MFI and FER and mixtures and/or intergrowths thereof.

The second SCR catalyst can be a base metal supported on a molecular sieve, wherein the base metal is selected from the group consisting of cerium (Ce), chromium (Cr), cobalt (Co), copper (Cu), iron (Fe), manganese (Mn), molybdenum (Mo), nickel (Ni), tungsten (W), and vanadium (V), and mixtures thereof.

The second coating can completely overlap the first coating.

The support with low ammonia storage can be a siliceous support comprising a silica or a zeolite with silica-to-alumina ratio of at least one of ≥100.

The blend comprising platinum on a support with low ammonia storage can further comprise at least one of palladium (Pd), gold (Au) silver (Ag), ruthenium (Ru) or rhodium (Rh).

The catalyst can provide an improvement in $N_2$ yield from ammonia at a temperature from about 200° C. to about 300° C. compared to a catalyst comprising a comparable formulation in which the first SCR catalyst is present as a first layer and platinum is present in a second layer and gas comprising $NH_3$ and NO passes through the first layer before passing through the second layer, wherein the improvement in $N_2$ yield is at least 10%.

The catalyst can provide reduced $N_2O$ formation from $NH_3$ and NOx at a temperature from about 200° C. to about 350° C. compared to a catalyst comprising a comparable formulation in which the first SCR catalyst is present as a first layer and platinum is present in a second layer and gas comprising $NH_3$ and NO passes through the first layer before passing through the second layer.

The substrate can be cordierite, a high porosity cordierite, a metallic substrate, an extruded honeycomb, or a filter.

The second SCR catalyst can be located on the inlet side of the catalyst comprising the blend of platinum on a support with low ammonia storage with the first SCR catalyst.

The second SCR catalyst can be located on the outlet side of the catalyst comprising the blend of platinum on a support with low ammonia storage with the first SCR catalyst.

The second SCR catalyst can comprise promoted-Ce—Zr or promoted-$MnO_2$.

The second coating can overlap at least 20% of the length of the first coating along an axis from the inlet to the outlet.

A method of improving the $N_2$ yield from ammonia and NOx in an exhaust gas at a temperature from about 200° C. to about 350° C., the method comprises contacting an exhaust gas comprising ammonia with a catalytic article described above for this aspect of the invention.

A method of treating exhaust gas comprising ammonia and NOx comprises contacting an exhaust gas comprising ammonia with a catalytic article as described above for this aspect of the invention.

In the 20th aspect of the invention, a catalytic article comprises:
a. a honeycomb wall-flow filter having porous walls;
b. a catalyst washcoat disposed on and/or within at least a portion of the porous walls, wherein the catalyst washcoat comprises:
  (i) a zeolite having an LTA framework Type and having a silica-to-alumina ratio (SAR) of about 15 to about 70 and comprising iron, manganese or a mixture of iron and manganese as an extra-framework metal; and
  (ii) about 1 to about 30 weight percent of a binder having a d90 particle size of less than 10 microns, based on the total weight of the washcoat.

The catalytic washcoat can comprise about 0.5 to about 10 weight percent of ion-exchanged iron, manganese, or a combination thereof, based on the total weight of the molecular sieve The d90 particle size can be is less than or equal to 5 microns.

The d90 particle size can be greater or equal to 1 micron.

The d90 particle size can be between 1 and 5 microns, endpoints included.

The binder can be selected from the group consisting alumina, silica, ceria, titania, zirconia, or combinations of two or more of these. Preferably, the binder is alumina. The alumina binder can be gamma-alumina, theta alumina or mixtures thereof.

The honeycomb wall-flow filter is preferably a ceramic monolith.

The honeycomb wall-flow filter can be constructed of one or more of aluminum titanate, cordierite, silicon carbide, silicon nitride, zirconia, mullite, alumina-silica-magnesia, zirconium silicate, ceramic fiber composite, wherein the filter is passivated or unpassivated.

In the 21st aspect of the invention, a filter article can comprise:
a. a wall-flow filter comprising a porous substrate having inlet and outlet faces; and
b. an SCR catalyst composition coated on the porous substrate inlet and/or outlet faces, and/or between the inlet and outlet faces, wherein the catalyst composition comprises crystals comprising a zeolite having an LTA Framework Type where the zeolite has a silica-to-alumina ratio (SAR) of about 15 to about 70 and the zeolite comprises iron, manganese or a mixture of iron and manganese as an extra-framework metal, and wherein:
  i. the crystals have a mean crystalline size of about 0.5 to about 15 µm, and
  ii. the crystals are present in the composition as individual crystals, agglomerations having a mean particle size of less than about 15 µm, or a combination of the individual crystals and the agglomerations.

The iron, manganese or a mixture of iron and manganese can be present in a total amount of from 0.5 to 10% of the weight of the zeolite.

The mean crystalline size can be from about 0.5 to about 5 µm. The majority of the crystals can have a size greater than about 0.5 µm and less than about 5 µm.

The mean crystal agglomerate size can be from about 0.5 to about 5 µm.

The mean crystal size can be from about 1.5 to about 5 µm.

The SCR catalyst composition can be unmilled.

The SCR catalyst composition can be coated directly on and/or in the porous substrate.

The SCR catalyst composition can be substantially free of carboxylic acids.

The porous substrate can be a ceramic wall-flow monolith having a porosity of about 40 to about 75% and a mean pore size of about 10 to about 25 µm.

The ceramic wall-flow monolith can comprise microcrack voids.

The filter article cannot have undergone heat treatment at a temperature above 350° C.

The porous substrate can be a ceramic wall-flow monolith having aluminum titanate as a predominate crystalline phase.

A method for making a filter article can comprise:
a. coating at least a portion of an unpassivated, ceramic wall-flow monolith with a washcoat slurry comprising crystals of a zeolite having an LTA Framework Type where the zeolite has a silica-to-alumina ratio (SAR) of about 15 to about 70 and the zeolite comprises iron, manganese or a mixture of iron and manganese as an extra-framework metal, wherein:
  i. the crystals have a mean crystalline size of about 0.5 µm to about 15 µm,
  ii. the crystals are present in the composition as individual crystals, agglomerations having a mean particle size of less than about 15 µm, or a combination of the individual crystals and the agglomerations; and
  iii. the molecular sieve is a zeolite having an LTA Framework Type where the zeolite has a silica-to-alumina ratio (SAR) of about 15 to about 70 and the zeolite comprises iron, manganese or a mixture of iron and manganese as an extra-framework metal,
b. removing excess washcoat slurry from the monolith, and
c. drying and calcining the coated monolith.

A system for treating an exhaust gas can comprise:
a. a catalytic wall-flow filter comprising
  i. a porous substrate having inlet and outlet faces; and
  ii. an SCR catalyst composition coated on the porous substrate inlet and/or outlet faces, and/or between the inlet and outlet faces, wherein the catalyst composition comprises crystals comprising a zeolite having an LTA Framework Type where the zeolite has a silica-to-alumina ratio (SAR) of about 15 to about 70 and the zeolite comprises iron, manganese or a mixture of iron and manganese as an extra-framework metal, wherein: the crystals have a mean crystalline size of about 0.5 µm to about 15 µm, the crystals are present in the composition as individual crystals, agglomerations having a mean particle size of less than about 15 µm, or a combination of the individual crystals and the agglomerations,
b. a conduit connecting the wall-flow filter with a source of lean burn exhaust gas containing particulate matter and $NO_x$, and
c. a reductant supply system for introducing a reductant into a lean combustion exhaust gas, wherein the reductant supply system is in fluid communication with the catalytic wall-flow filter and is disposed upstream of the catalytic wall-flow filter relative to gas flow through the filter.

A method for treating an exhaust gas can comprise:
a. passing a lean combustion exhaust gas comprising particulate matter and $NO_x$ through a catalytic wall-flow filter comprising:
  i. a porous substrate having inlet and outlet faces; and
  ii. an SCR catalyst composition coated on the porous substrate inlet and/or outlet faces, and/or between the inlet and outlet faces, wherein the catalyst composition comprises crystals comprising a zeolite having an LTA Framework Type where the zeolite has a silica-to-alumina ratio (SAR) of about 15 to about 70 and the zeolite comprises iron, manganese or a mixture of iron and manganese as an extra-framework metal, wherein: the crystals have a mean crystalline size of about 0.5 µm to about 15 µm, the crystals are present in the composition as individual crystals, agglomerations having a mean particle size of less than about 15 µm, or a combination of the individual crystals and the agglomerations, and wherein the passing separates at least a portion of the particulate matter from the exhaust gas to form a partially purified exhaust gas;

b. contacting, in the presence of a reducing agent, the lean combustion exhaust gas and/or the partially purified exhaust gas with the SCR catalyst composition to selectively reduce at least a portion of the $NO_x$ to $N_2$ and other components.

In the 22nd aspect of the invention, a diesel particulate filter can comprise:

a. a wall-flow filter substrate having a mean pore size, an inlet side, an outlet side, and a porous interior between the inlet and outlet sides; and b. a catalyst composition coated from the outlet side of the substrate, wherein the catalyst composition comprises a zeolite having an LTA Framework Type where the zeolite has a silica-to-alumina ratio (SAR) of about 15 to about 70 and the zeolite comprises iron, manganese or a mixture of iron and manganese as an extra-framework metal, and the catalytic composition has a $d_{50}$ particle size distribution, wherein the $d_{50}$ particle size distribution is greater than or equal to the mean pore size divided by 4.9, and wherein the inlet side is substantially free of a catalyst coating.

The iron, manganese or a mixture of iron and manganese can be present in a total amount of from 0.5 to 10% of the weight of the zeolite The mean pore size can be at least about 10 µm, preferably at least about 15 µm.

The wall-flow filter substrate can further comprise a porosity of at least about 45 percent, preferably at least about 55 percent, more preferably at least about 65 percent.

The $d_{50}$ particle size distribution can be at least about 2.5 microns, preferably at least about 3.5 microns, more preferably at least about 4 microns.

The diesel particulate filter can have a porous interior that is substantially free of a catalyst coating.

The catalyst composition can be present in a diesel particulate filter in an amount of about 0.5 to about 3.0 g/in3, preferably about 0.9 to about 1.8 g/in³.

The catalyst composition can be present in a diesel particulate filter as a single layer.

The diesel particulate filter can further comprise additional catalyst layers coated from the outlet side of the filter.

One or more of the additional catalyst layers can comprise an ammonia slip catalyst.

A system for treating a lean-burn exhaust gas can comprise:

a. a diesel particulate filter as described above for this aspect of the invention; and b. at least one exhaust system component in fluid communication with the diesel particulate filter, wherein the exhaust system component is selected from the group consisting of a source of $NO_2$ disposed upstream of the diesel particulate filter, a source of reductant disposed upstream of the diesel particulate filter, an AMOX catalyst, a NOx trap, a NOx absorber catalyst, a diesel oxidation catalyst, and an SCR catalyst.

A method for reducing soot in a lean burn exhaust gas can comprise:

a. contacting an exhaust gas stream carrying soot and optionally containing $NO_x$, with a diesel particulate filter as described above for this aspect of the invention;

b. trapping at least a portion of the soot on and/or in the diesel particulate filter while allowing the exhaust gas to pass through the diesel particulate filter; and c. periodically and/or continuously burning the trapped soot to regenerate the filter.

The method for reducing soot in a lean burn exhaust can further comprise the step of:

d. contacting the exhaust gas with a SCR catalyst coated from the outlet side of the filter to reduce the concentration of NOx in exhaust gas.

In the 23rd aspect of the invention, a diesel particulate filter can comprise:

a. a wall-flow filter substrate having a mean pore size, an inlet side, an outlet side, and a porous interior between the inlet and outlet sides; and b. a catalyst composition coated from the outlet side of the substrate, wherein the catalyst composition has a $d_{50}$ particle size distribution, c. wherein the $d_{50}$ particle size distribution is less than the mean pore size divided by 4.9, and wherein the inlet side is substantially free of a catalyst coating.

wherein the catalyst composition comprises a selective reduction catalyst comprising a zeolite having an LTA Framework Type where the zeolite has a silica-to-alumina ratio (SAR) of about 15 to about 70 and the zeolite comprises iron, manganese or a mixture of iron and manganese as an extra-framework metal.

The mean pore size can be at least about 10 µm, preferably at least about 15 µm.

The wall-flow filter substrate can further comprise a porosity of at least about 45 percent, preferably at least about 55 percent, more preferably at least about 65 percent.

The $d_{50}$ particle size distribution can be not more than about 2.5 microns, preferably not more than about 2 microns, more preferably about 1 to about 2 microns.

The porous interior of the wall-flow filter substrate can be substantially free of a catalyst coating.

The catalyst composition can be present in an amount of about 0.5-3.0 g/in³, preferably in an amount of about 0.9-1.8 g/in³.

The catalyst composition can be present as a single layer.

The diesel particulate filter can further comprise one or more additional catalyst layers coated from the outlet side of the filter.

The catalyst coating layer can comprise an ammonia slip catalyst.

A system for treating a lean-burn exhaust gas comprising:

a. a diesel particulate filter as described above for this aspect of the invention; and b. at least one exhaust system component in fluid communication with the diesel particulate filter, wherein the exhaust system component is selected from the group consisting of a source of $NO_2$ disposed upstream of the diesel particulate filter, a source of reductant disposed upstream of the diesel particulate filter, an AMOX catalyst, a NOx trap, a NOx absorber catalyst, a diesel oxidation catalyst, and an SCR catalyst.

A method for reducing soot in a lean burn exhaust gas comprising:

a. contacting an exhaust gas stream carrying soot and optionally containing $NO_x$, with a diesel particulate filter as described above for this aspect of the invention;

b. trapping at least a portion of the soot on and/or in the diesel particulate filter while allowing the exhaust gas to pass through the diesel particulate filter; and c. periodically and/or continuously burning the trapped soot to regenerate the filter.

The method can further comprise the step of: (d) contacting the exhaust gas with a SCR catalyst coated from the inlet side of the filter to reduce the concentration of NOx in exhaust gas.

In the 24th aspect of the invention, a catalytic wall-flow monolith for use in an emission treatment system comprises a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels is open at the second face and closed at the first face, wherein a first catalytic material comprising a zeolite having an LTA Framework Type where the zeolite has a silica-to-alumina ratio (SAR) of about 15 to about 70 and the zeolite comprises iron, manganese or a mixture of iron and manganese as an extra-framework metal, or a zeolite having an SFW Framework Type, LTA structure, where the first catalytic material is distributed within the porous substrate, wherein a microporous membrane is provided in the first plurality of channels on a first portion, extending in the longitudinal direction, of the first plurality of inner surfaces, and wherein the first portion extends from the first face for 75 to 95% of a length of the first plurality of channels.

The first portion can extend 80 to 90% of a length of the first plurality of channels.

The microporous membrane can have a thickness which decreases along the longitudinal direction, such that the thickness is greatest in a region adjacent the first face.

The porous substrate can have a first section extending in the longitudinal direction from the first face and a second section extending in the longitudinal direction from the second face and extending to the first section, and wherein the first catalytic material is distributed throughout the second section. The catalytic wall-flow monolith can have a ratio of a length of the first section in the longitudinal direction to the length of the second section in the longitudinal direction from 5:95 to 15:85.

An emission treatment system for treating a flow of a combustion exhaust gas can comprise the catalytic wall-flow monolith described above for this aspect of the invention, wherein the second face is downstream of the first face.

A method for the manufacture of a catalytic wall-flow monolith described above for this aspect of the invention comprises:

providing a porous substrate having a first face and an second face defining a longitudinal direction therebetween and first and second pluralities of channels extending in the longitudinal direction, wherein the first plurality of channels is open at the first face and closed at the second face, and wherein the second plurality of channels is open at the second face and closed at the first face, wherein the first plurality of channels provide a first plurality of inner surfaces and wherein the second plurality of channels provide a second plurality of inner surfaces;

infiltrating the porous substrate with a washcoat containing a first catalytic material to provide the first catalytic material distributed within the porous substrate; and forming a microporous membrane on the first plurality of inner surfaces.

A method for treating a flow of a combustion exhaust gas comprising $NO_x$ and particulate matter can comprise passing the exhaust stream through the monolith described above for this aspect of the invention, wherein the second face is downstream of the first face.

A catalytic wall-flow monolith for use in an emission treatment system comprises a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels are open at the second face and closed at the first face, wherein a first catalytic material comprising a zeolite having an LTA Framework Type where the zeolite has a silica-to-alumina ratio (SAR) of about 15 to about 70 and the zeolite comprises iron, manganese or a mixture of iron and manganese as an extra-framework metal, or a zeolite having an SFW Framework Type, where the first catalytic material is distributed throughout the porous substrate, wherein a microporous membrane is provided in the first plurality of channels, coating the first plurality of inner surfaces, and wherein the microporous membrane has a thickness which increases along the longitudinal direction, such that the thickness is greatest in a region adjacent the closed second face.

The microporous membrane can have a thickness in the region adjacent the closed second surface such that the backpressure, in use, is at least 20% greater than the backpressure in a region adjacent the first face.

The microporous membrane can comprise a second catalytic material that is different from the first catalytic material, where the second catalytic material is preferably a soot combustion promoter catalyst.

The catalytic wall-flow monolith can further comprise a coating on the microporous membrane for capturing ash, wherein the coating preferably comprises ceria.

The catalytic wall-flow monolith can further comprise a coating on the microporous membrane for catalytic urea hydrolysis.

The microporous membrane can have a mean thickness of at most 80 μm, preferably from 20 to 60 μm.

An emission treatment system for treating a flow of a combustion exhaust gas can comprise the catalytic wall-flow monolith described above for this aspect of the invention, wherein the second face is downstream of the first face.

A catalytic wall-flow monolith for use in an emission treatment system comprises a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels are open at the second face and closed at the first face, wherein a first catalytic material comprising a zeolite having an LTA Framework Type where the zeolite has a silica-to-alumina ratio (SAR) of about 15 to about 70 and the zeolite comprises iron, manganese or a mixture of iron and manganese as an extra-framework metal, or a zeolite having an SFW Framework Type, where the first catalytic material is distributed throughout the porous substrate, wherein a microporous membrane is provided in the first plurality of channels, coating the first plurality of inner surfaces, and wherein the microporous membrane has a thickness which increases along the longitudinal direction, such that the thickness is greatest in a region adjacent the closed second face.

A catalytic wall-flow monolith for use in an emission treatment system can comprise a porous substrate and having a first face and a second face defining a longitudinal direction therebetween, and a first and a second pluralities of channels extending in the longitudinal direction, wherein the first plurality of channels provides a first plurality of inner surfaces and is open at the first face and closed at the second face, and wherein the second plurality of channels is open at the second face and closed at the first face, wherein a first catalytic material comprising a zeolite having an LTA Framework Type where the zeolite has a silica-to-alumina ratio (SAR) of about 15 to about 70 and the zeolite comprises iron, manganese or a mixture of iron and manganese as an extra-framework metal is distributed within the porous substrate from the first face for 75 to 95% of a length of the first plurality of channels, and wherein a microporous membrane is disposed on the porous substrate along the length of the first and/or second plurality of channels.

In the 25th aspect of the invention, a system for treating exhaust gases containing $NO_x$ from an engine comprises:

a. a flow-through monolith having a first catalytic composition for selective catalytic reduction of $NO_x$ and having a first volume;

b. a close-coupled particulate matter filter having a second catalytic composition for reduction of particulate matter and selective catalytic reduction of $NO_x$ and having a second volume; and c. a volume ratio of the first volume to the second volume of less than about 1:2, wherein the flow-through monolith is in fluid communication with, and incorporated upstream of, the particulate matter filter, wherein at least one of the first catalytic composition or the second catalytic composition comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

The iron, manganese or a mixture of iron and manganese can be present in a total amount of from 0.5 to 10% of the weight of the zeolite.

The volume ratio can be about 1:10 to about 1:2, preferably about 1:6 to about 1:4.

The flow-through monolith can be an extruded monolith.

The particulate matter filter can be an inert substrate coated and/or impregnated with the second catalytic composition.

The substrate can be made primarily of either cordierite or metal.

The flow-through monolith can have a lower heat capacity relative to the particulate matter filter.

The flow-through monolith can have a lower specific heat capacity relative to the particulate matter filter.

The flow-through monolith can have a specific heat that is about 20 to about 80% of the specific heat capacity of the particulate matter filter.

The flow-through monolith can have a specific heat that is about 35 to about 65% of the specific heat capacity of the particulate matter filter.

One of the first and second catalytic compositions can comprise a base-metal promoted zeolite or silicoaluminophosphate molecular sieve.

The flow-through monolith in the system can have an SCR catalyst loading that is greater than an SCR catalyst loading on the particulate matter filter.

The flow-through monolith can have an SCR catalyst loading of about 2 to 15 $g/in^3$.

The first and second catalytic compositions can be different, provided that one of the first and second catalytic compositions comprise comprises a zeolite having an LTA Framework Type where the zeolite has a silica-to-alumina ratio (SAR) of about 15 to about 70 and the zeolite comprises iron, manganese or a mixture of iron and manganese as an extra-framework metal and the other one of the first and second catalytic compositions comprise comprises a base-metal promoted zeolite or silicoaluminophosphate molecular sieve.

The second catalytic composition for selective catalytic reduction of $NO_x$ can be coated and/or impregnated on a downstream side of the particulate matter filter.

The second catalytic composition for selective catalytic reduction of $NO_x$ can be coated and/or impregnated on an upstream side of the particulate matter filter.

The particulate matter filter can be about 0.01 to about 0.25 meters downstream of the flow-through monolith.

The system can further comprise a source of reductant injection in fluid communication with, and disposed between, the flow-through monolith and the particulate matter filter.

A method for treating an engine exhaust gas stream containing $NO_x$ and soot can comprise:

a. contacting the exhaust gas stream, in the presence of a reductant, with a flow-through monolith having a first SCR catalytic composition loading and a first volume to produce an intermediate gas stream wherein a first portion of the $NO_x$ has been converted to $N_2$ and $O_2$;

b. contacting the intermediate gas stream with a close-coupled catalytic particulate matter filter having a second SCR catalytic composition loading and a second volume, wherein the second volume is at least about twice the first volume, to trap a portion of the soot and produce a clean gas stream wherein a second portion of the $NO_x$ has been converted to $N_2$ and $O_2$;

c. oxidizing the portion of the soot at a soot oxidation temperature to regenerate the catalytic particulate matter filter;

d. heating the catalytic close-coupled flow-through monolith to an SCR light off temperature before heating the catalytic particulate matter filter to an SCR light off temperature; and e. maintaining, under low load conditions, the soot oxidation temperature of the catalytic particulate matter filter for a longer period of time as compared to a catalytic particulate matter filter having a volume equal to the first and second volumes combined, wherein at least one of the first and second SCR catalysts comprises a zeolite having an LTA Framework Type where the zeolite has a silica-to-alumina ratio (SAR) of about 15 to about 70 and the zeolite comprises iron, manganese or a mixture of iron and manganese as an extra-framework metal.

Iron, manganese or a mixture of iron and manganese can be present in a total amount of from 0.5 to 10% of the weight of the zeolite.

The steps of contacting the exhaust gas stream and the contacting the intermediate gas stream can have a higher conversion of the $NO_x$ as compared to a catalytic particulate matter filter having a volume equal to the first and second volumes combined and an SCR catalyst loading equal to the first and second loadings.

In the 26th aspect of the invention, a system for treating an exhaust gas comprises:
  a. a first SCR catalyst zone comprising an iron loaded medium- or large-pore molecular sieve having a first ammonia storage capacity; and
  b. a second SCR catalyst zone comprising a zeolite having an LTA Framework Type where the zeolite has a silica-to-alumina ratio (SAR) of about 15 to about 70 and the zeolite is ion-exchanged with iron, manganese or a mixture of iron and manganese and having a second ammonia storage capacity,
wherein the first SCR catalyst zone is disposed upstream of the second SCR catalyst zone with respect to normal exhaust gas flow through the system and wherein the second ammonia storage capacity is greater than the first ammonia storage capacity.

The first ammonia storage capacity can be about 0.5 to about 2.0 mmol/g catalyst, and the second ammonia storage capacity can be about 0.5 to 4.0 mmol/g catalyst.

The system can be free of any catalyst disposed between the first and second SCR catalyst zones.

The first SCR catalyst zone can be essentially free of copper and the second catalyst zone can be essentially free of iron.

The first SCR catalyst zone can comprise an iron loaded molecular sieve having a BEA framework.

The molecular sieve of the first SCR catalyst zone can have a silica-to-alumina ratio of about 10 to about 50.

The first and second SCR catalyst zones can be coated on a flow-through honeycomb substrate having an inlet end, an outlet end, and an axial length measured from the inlet end to the outlet end, and the first and second SCR catalyst zones are adjacent or at least partially overlapping.

The first zone is adjacent to the second zone.

The first zone completely overlays the second zone.

The first zone extends from the inlet end to a first end point that is position about 10 to 40 percent of the axial length and wherein the second zone is about 20 to 90 percent of the axial length, provided that the first and second zones are adjacent or overlap by less than 90 percent of the axial length.

The system can further comprise an oxidation catalyst zone downstream of the second SCR catalyst zone.

The second SCR catalyst zone can completely overlap the oxidation catalyst zone.

The oxidation catalyst can comprise a platinum group metal.

The first SCR catalyst zone can be on a wall-flow filter having an inlet side and an outlet side, and the second SCR catalyst zone can be on a flow-through honeycomb substrate, provided that there is no intervening catalyst between the first SCR catalyst zone and the second SCR catalyst zone.

The system can further comprise a partial NOx absorber disposed upstream of the first SCR catalyst zone.

The partial NOx absorber can be coated on a flow through substrate positioned upstream of the wall-flow filter.

The system can further comprise an ammonia slip catalyst coated on the flow-through substrate downstream of the second SCR catalyst zone.

The system can further comprise an engine manifold or turbocharger and a conduit for channeling exhaust gas from the engine manifold or turbocharger to the partial NOx absorber, provided that the system is free of any exhaust gas treatment catalyst between the engine manifold or turbocharger and the partial NOx absorber.

A method for treating an exhaust gas comprising the step of contacting, in series, a mixture of ammonia and exhaust gas derived from an internal combustion engine with (a) a first SCR zone comprising an iron loaded molecular sieve having an ammonia storage capacity of not more than about 1.5 mmol $NH_3$/g, and (b) a second SCR zone comprising a copper-loaded molecular sieve having an ammonia storage capacity of at least about 1.2 mmol $NH_3$/g catalyst, provided that iron loaded molecular sieve has a lower ammonia storage capacity relative to the copper-loaded molecular sieve.

In the 27th aspect of the invention, a method for reducing $N_2O$ emissions in an exhaust gas comprises contacting an exhaust gas containing $NH_3$ and an inlet NO concentration with an SCR catalyst composition a zeolite having an LTA Framework Type where the zeolite has a silica-to-alumina ratio (SAR) of about 15 to about 70 and the zeolite comprises iron, manganese or a mixture of iron and manganese as an extra-framework metal and iron, manganese or a mixture of iron and manganese can be present in a total amount of from 0.5 to 10% of the weight of the zeolite to produce a purified gas containing an outlet NO concentration and an outlet $N_2O$ concentration,
  a. wherein the inlet NO concentration and outlet NO concentrations have a relative ratio of >about 4, and
  b. wherein the inlet NO concentration and outlet $N_2O$ concentrations have a relative ratio of >about 50.

The inlet NO concentration and outlet NO concentrations can have a relative ratio of >about 5, preferably >about 10.

The inlet NO concentration and outlet $N_2O$ concentrations can have a relative ratio of >about 80, preferably >about 100.

NO and $NO_2$ can be present in a ratio of about 4:1 to about 1:3 by volume.

$NH_3$ can be present in exhaust gas entering the SCR catalyst at an $NH_3$/NO ratio of about 0.5:1 to about 1:2 and an $NH_3$/$NO_2$ ratio of about 1:1 to about 6:3.

A system for treating an exhaust gas comprises, in series and in fluid communication, a diesel oxidation catalyst, a source of nitrogen-based reductant, and an SCR catalyst, wherein the SCR catalyst comprises a zeolite having an LTA Framework Type where the zeolite has a silica-to-alumina ratio (SAR) of about 15 to about 70 and the zeolite comprises iron, manganese or a mixture of iron and manganese as an extra-framework, and wherein the SCR catalyst is coated on a honeycomb wall-flow filter or flow-through monolith or is an extruded honeycomb body.

The iron, manganese or a mixture of iron and manganese can be present in a total amount of from 0.5 to 10% of the weight of the zeolite

EXAMPLES

Example 1. Mn-Containing LTA

A sample of LTA (SAR=46) impregnated with manganese was prepared by forming a mixture by adding a sample of dried LTA to a solution of $Mn(OAc)_2$ in deionized water. The amount of Mn in the solution provided a ratio of LTA:Mn of 96.67:3.33. The mixture was heated at 80° C. for 4 hours while being rotated at 40 rpm. The mixture was then dried overnight at 80 C. The dried Mn-containing zeolite was then calcined by heating the zeolite from room temperature to 120° C. by increasing the temperature as a rate of 3° C./min. The sample was maintained at 120° C. for 2 hours, then the temperature was increased at the rate of 3° C./min until the temperature reached 550° C. The sample was maintained at 550° C. for 4 hours, then the heating was stopped and the sample was returned to room temperature.

Example 2. Mn-Containing AFX

A sample of AFX (SAR=22) impregnated with manganese was prepared as described above using AFX in place of LTA.

Example 3. Mn-Containing BEA

A sample of BEA (SAR=28.5) impregnated with manganese was prepared as described above using BEA in place of LTA.

Example 4. Mn-Containing CHA

A sample of CHA (SAR=20.9) impregnated with manganese was prepared as described above using BEA in place of LTA.

Examples 5-8: Aged Samples

Samples from each of the above examples were hydrothermally aged by treating the samples at 550° C. for 100 hours under an atmosphere of 10% $H_2O$ in air.

Testing of Samples

Powder samples of examples 1-4 (fresh) were tested to determine their ability to catalyze the conversion of NOx, and to determine the amounts of $N_2O$ formed. Each of these samples were separately loaded into a synthetic catalyst activity test (SCAT) reactor and tested using a synthetic diesel exhaust gas mixture (at inlet) containing: 500 ppm $NH_3$, 250 ppm NO, 250 ppm $NO_2$, with the balance $N_2$ at a space velocity of 90,000 $h^{-1}$.

Powder samples of examples 5-8 (aged) were tested to determine their ability to catalyze the conversion of NOx, and to determine the amounts of $N_2O$ formed. Each of these samples were separately loaded into a synthetic catalyst activity test (SCAT) reactor and tested using a synthetic diesel exhaust gas mixture as described above.

FIG. 1 shows that fresh Mn-LTA provides better NOx conversion that Mn-CHA and Mn-AFX, two other small pore zeolites, over the temperature range of about 190 to about 250° C. Mn-BEA, a large pore zeolite, provides better NOx conversion from about 150 to about 200 C than the three Mn-containing small pore zeolites.

Figure 2:
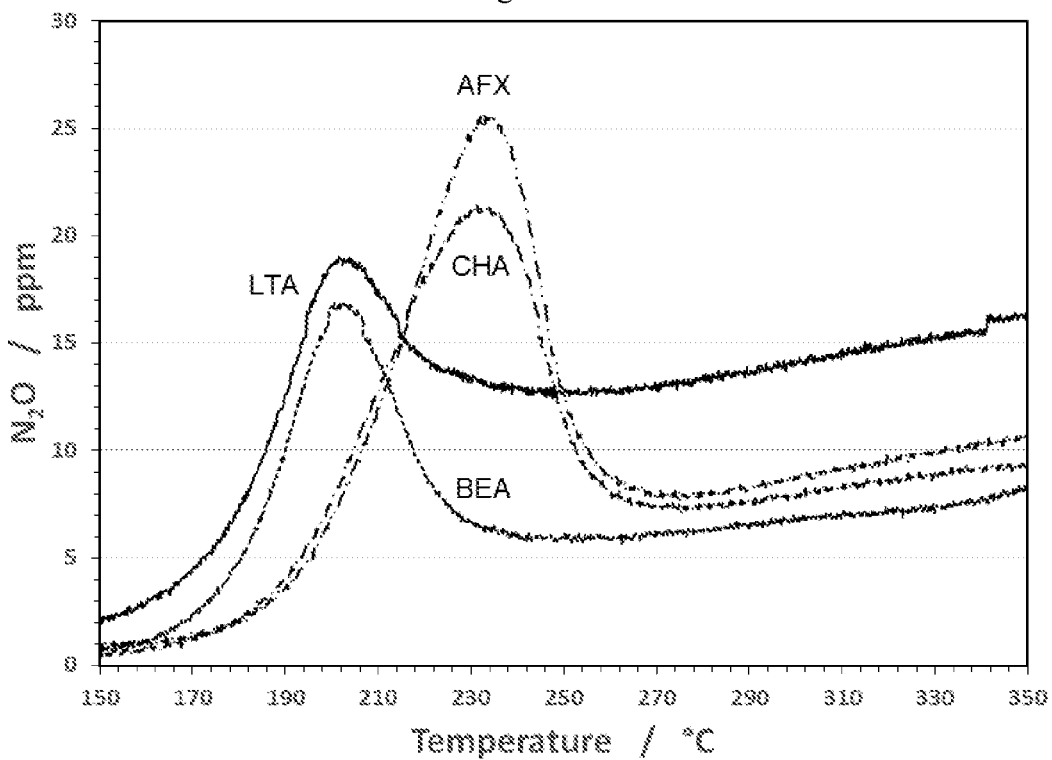
FIG. 2 shows the concentrations of $N_2O$ formed using fresh AFX, BEA, CHA and LTA catalysts containing extra-framework Mn at temperatures from 150° C. to 500° C.

FIG. 2 shows that fresh Mn-LTA forms lower peak concentration of $N_2O$ than Mn-CHA and Mn-AFX.

Figure 3:
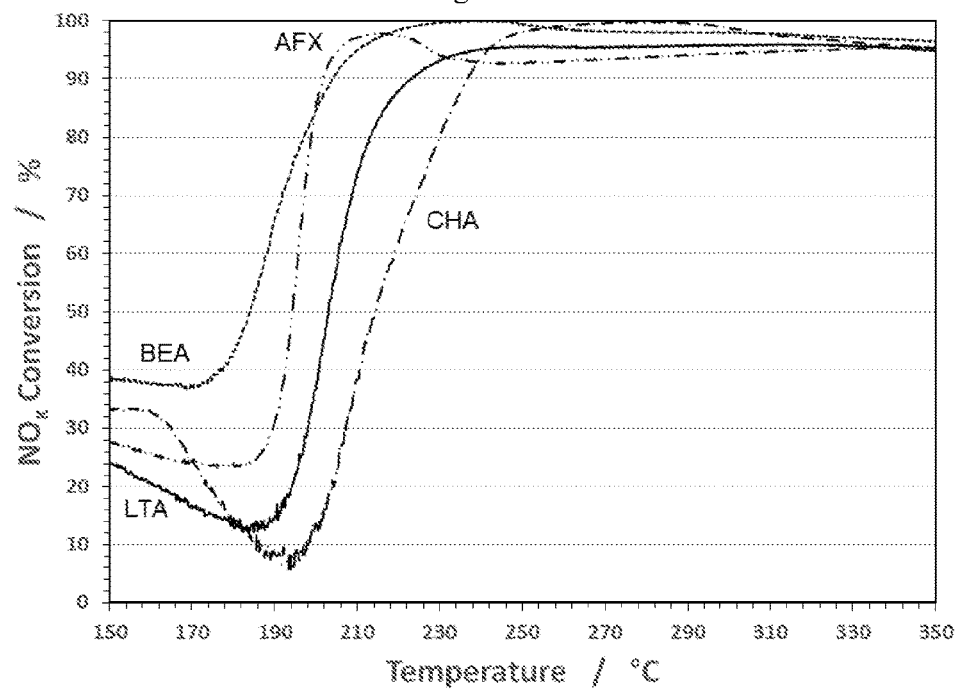
FIG. 3 shows the percent NOx conversion using aged AFX, BEA, CHA and LTA catalysts containing extra-framework Mn at temperatures from 150° C. to 500° C.

FIG. 3 shows that aged Mn-LTA provides better NOx conversion that Mn-CHA over the temperature range of about 180 to about 240° C.

Figure 4:
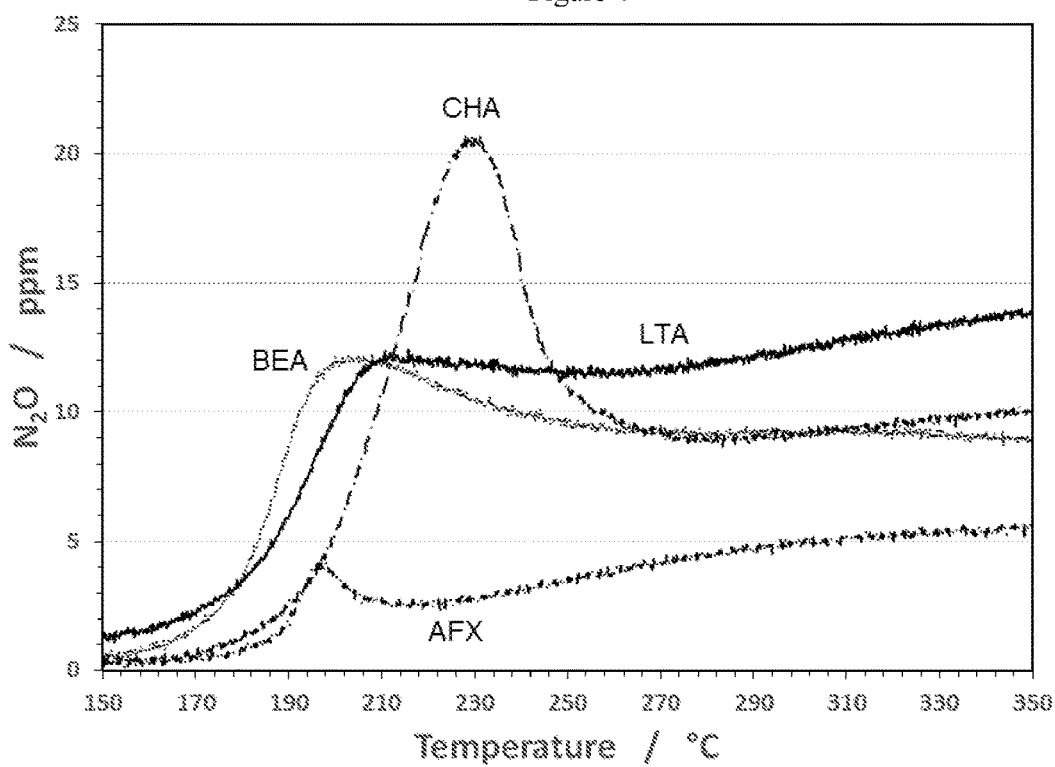
FIG. 4 shows the concentrations of $N_2O$ formed using aged AFX, BEA, CHA and LTA catalysts containing extra-framework Mn at temperatures from 150° C. to 500° C.

FIG. 4 shows that aged Mn-LTA provides lower peak concentration of $N_2O$ than Mn-CHA over the temperature range of about 210 to about 250° C.

What is claimed is:

1. A catalyst composition comprising an aluminosilicate molecular sieve having an LTA framework and a mole ratio of silica-to-alumina of about 15 to about 70, and about 0.5 to about 10 weight percent of manganese as extra-framework metal, based on the total weight of the molecular sieve material.

2. The catalyst composition of claim 1, wherein the manganese is present in a loading of about 1 to about 10 weight percent, based on the total weight of the zeolite material.

3. A catalytic article comprising a catalyst composition according to claim 1 and a substrate.

4. The catalytic article of claim 3, wherein the substrate is a flow-through monolith.

5. The catalyst article of claim 3, wherein the substrate is a wall-flow filter.

6. The catalyst article of claim 3, wherein the catalyst composition is within the substrate.

7. The catalyst article of claim 3, wherein the catalyst composition is on the substrate.

8. The catalyst article of claim 3, wherein the substrate is extruded and the catalyst composition is within the substrate.

9. The catalyst article of claim 3, wherein the substrate is extruded and the catalyst composition is a coating on the substrate.

10. A system for treating an exhaust gas comprising:
  a. a catalyst article according to claim 3; and
  b. one or more upstream components selected from a diesel oxidation catalyst, a $NO_X$ absorber catalyst, a lean $NO_X$ trap, a filter, an $NH_3$ injector, and an SCR catalyst.

11. A system for treating an exhaust gas of claim 10, further comprising a downstream ammonia slip catalyst.

12. An engine comprising the catalyst composition of claim 1.

13. A vehicle comprising the catalyst composition of claim 1.

14. A method for treating an exhaust gas comprising:
  contacting an exhaust gas comprising $NO_x$ and a reductant with a catalyst composition according to claim 1; and
  selectively reducing at least a portion of the $NO_x$ to $N_2$ and $H_2O$.

15. The method of claim 13, wherein the exhaust gas is derived from a lean burn internal combustion engine.

16. The method of claim 14, wherein the reductant is $NH_3$.

17. The method of claim 16, wherein at least a portion of said $NH_3$ is derived from a lean $NO_X$ trap (LNT), NAC, or a $NO_X$ storage catalyst.

18. The method of claim 14, wherein said exhaust gas contacting the catalyst alternates between rich and lean.

* * * * *